United States Patent [19]

Hummert et al.

[11] 4,370,717

[45] Jan. 25, 1983

[54] ELEVATOR BANK SIMULATION SYSTEM

[75] Inventors: George T. Hummert, Oakmont; Thomas D. Moser; David M. Edison, both of Murrysville, all of Pa.

[73] Assignee: Westinghouse Electric Corp., Pittsburgh, Pa.

[21] Appl. No.: 510,940

[22] Filed: Sep. 30, 1974

[51] Int. Cl.³ .................. B66B 3/00; G06F 15/20
[52] U.S. Cl. ........................... 364/436; 364/578; 187/29 R
[58] Field of Search ........... 235/151; 187/29 R, 29 K, 187/29 S, 29 AB, 29 AJ, 29 AP; 444/1; 364/436, 578

[56] References Cited

U.S. PATENT DOCUMENTS

| | | | |
|---|---|---|---|
| 3,400,374 | 9/1968 | Schumann | 340/172.5 |
| 3,711,862 | 1/1973 | Story | 444/1 |
| 3,804,209 | 4/1974 | Edison | 187/29 R |
| 3,851,734 | 12/1974 | Sackin | 187/29 R |

Primary Examiner—Edward J. Wise
Attorney, Agent, or Firm—D. R. Lackey

[57] ABSTRACT

An interactive, real time elevator bank simulation system including a display panel, dispatcher control, and a processor unit. The display panel includes illuminable control devices and illuminable display devices which are controlled to represent movement of the various elevator cars of the bank. The control devices enable an operator to interact with the system, such as by entering traffic requests, and to observe in real time the results of the requests on the operation of the elevator bank. The operator initiated requests are processed by the processing unit, and the processing unit controls the illumination of the operator actuated control devices on the display panel. This positive feedback arrangement provides optical acknowledgment to the operator that his request has been received by the processor unit.

23 Claims, 15 Drawing Figures

Microfiche Appendix Included
(6 Microfiche, 320 Pages)

CORE MAP

| WORD NAME | ADDRESS | BIT 11 | 10 | 9 | 8 | 7 | 6 | 5 | 4 | 3 | 2 | 1 | BIT 0 |
|---|---|---|---|---|---|---|---|---|---|---|---|---|---|
| CL 000 | 0 1111 0000 0000 | | | | | | | | | CC 000 (CAR D) | CC 000 (CAR C) | CC 000 (CAR B) | CC 000 (CAR A) |
| CL 001 | 0000 0001 | | | UC 000 | DC 000 | | | | | CC 001 (D) | CC 001 (C) | CC 001 (B) | CC 001 (A) |
| CL 002 | 0000 0010 | | | UC 001 | DC 001 | | | | | CC 002 (D) | CC 002 (C) | CC 002 (B) | CC 002 (A) |
| | | | | UC 002 | DC 002 | | | | | | | | |
| CL 125 | 0111 1101 | | | | | | | | | CC 125 | CC 125 | CC 125 | CC 125 |
| CL 126 | 0111 1110 | | | UC 125 | DC 125 | | | | | CC 126 | CC 126 | CC 126 | CC 126 |
| CL 127 | 0111 1111 | | | UC 126 | DC 126 | | | | | CC 127 (D) | CC 127 (C) | CC 127 (B) | CC 127 (A) |
| | | | | UC 127 | DC 127 | | | | | | | | |
| 1W0-CA | 0 1111 1001 0000 | AVAS | | 32L | DRCL | CCBL | CCAB | CALL | UPSV | UPTR | INSC | BYPS | SLDN |
| 1W1-CA | 1010 0000 | AVP6 | AVP5 | AVP4 | AVP3 | AVP2 | AVP1 | AVP0 | | | WT50 | CREG | ATSV |
| 1W2-CA | 1011 0000 | | | | | | | | | WT75 | | | |
| 0W0-CA | 1000 1101 | FAD6 | FAD5 | FAD4 | FAD3 | FAD2 | FAD1 | FAD0 | SASS | TASS | M0DI | M0DO | PARK |
| 0W1-CA | 1001 1101 | | | HLM1 | HLM0 | | | DCL0 | DOPN | CCAI | MCCR | INUP | BSMT |
| 0W2-CA | 1010 1101 | | | | | | STT | MNFL | NEXT | AVAD | | | |
| 1W0-CB | 1001 0010 | | | | | | | | | | | | |
| 1W1-CB | 1010 0010 | | | | | (SAME AS CAR A) | | | | | | | |
| 1W2-CB | 1011 0010 | | | | | | | | | | | | |
| 0W0-CB | 1000 1111 | | | | | | | | | | | | |
| 0W1-CB | 1001 1111 | | | | | | | | | | | | |
| 0W2-CB | 1010 1111 | | | | | | | | | | | | |

CORRIDOR & CAR CALLS / CAR A CAR SIGNALS / CAR B CAR SIGNALS / REMAINING CARS OF BANK

FIG. 3

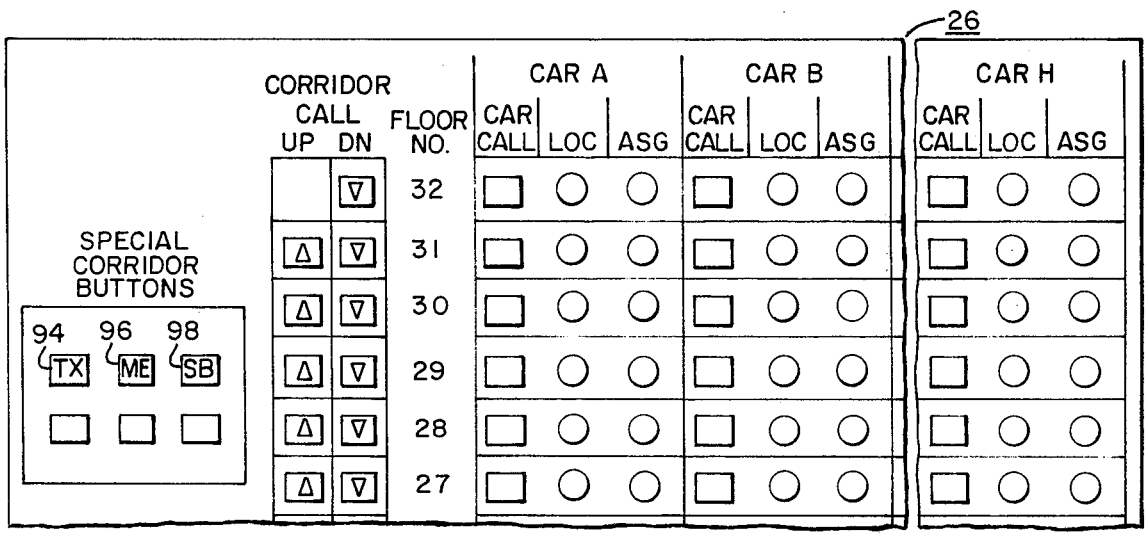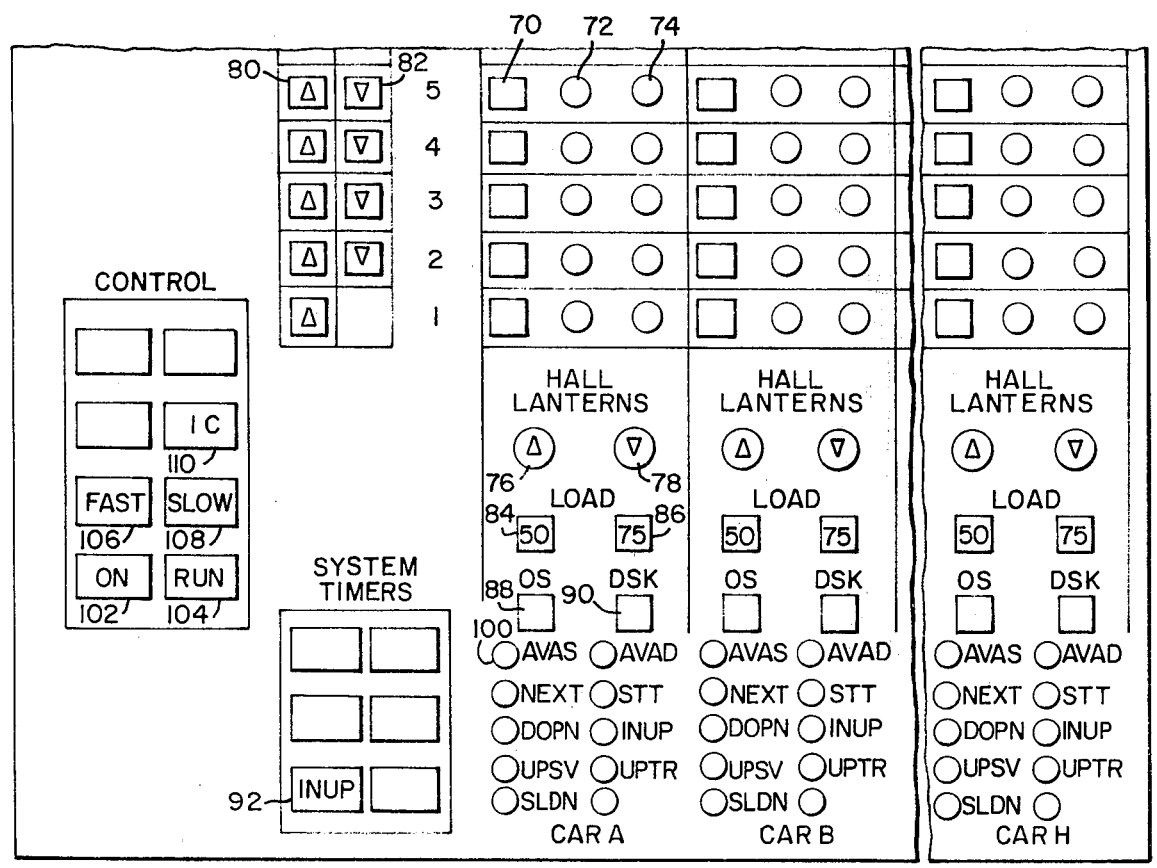
FIG. 4

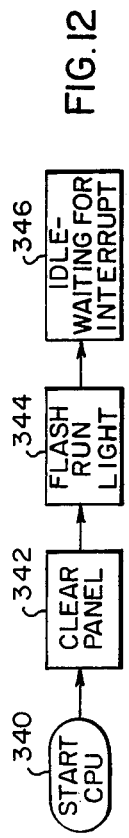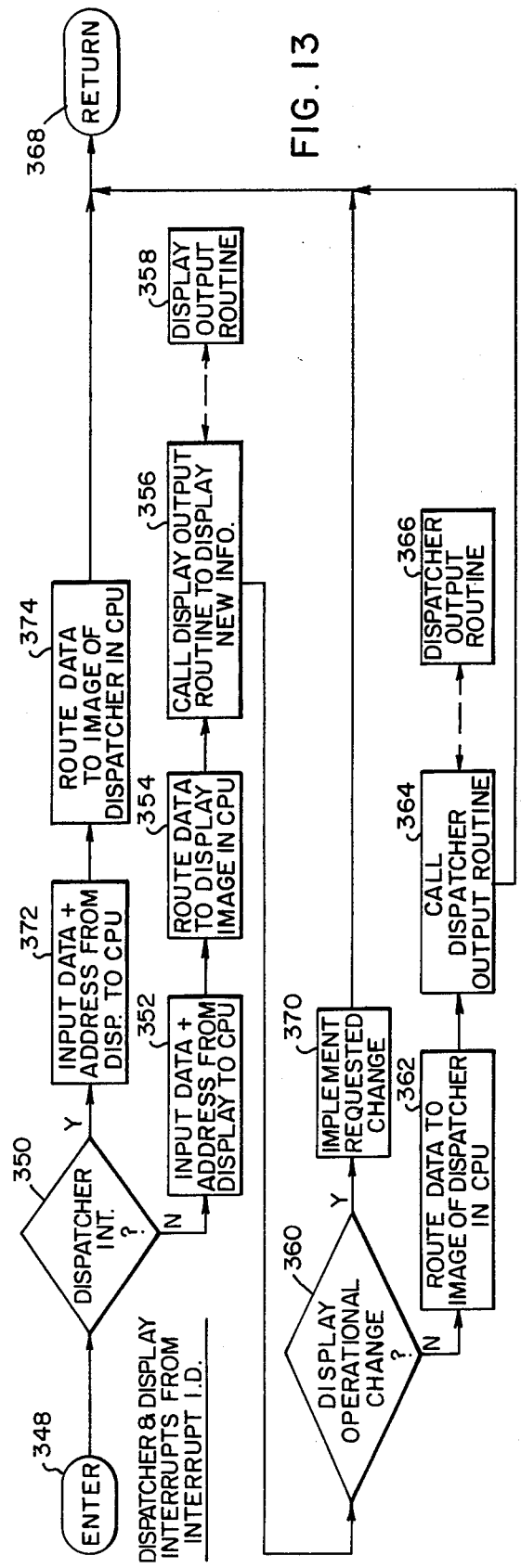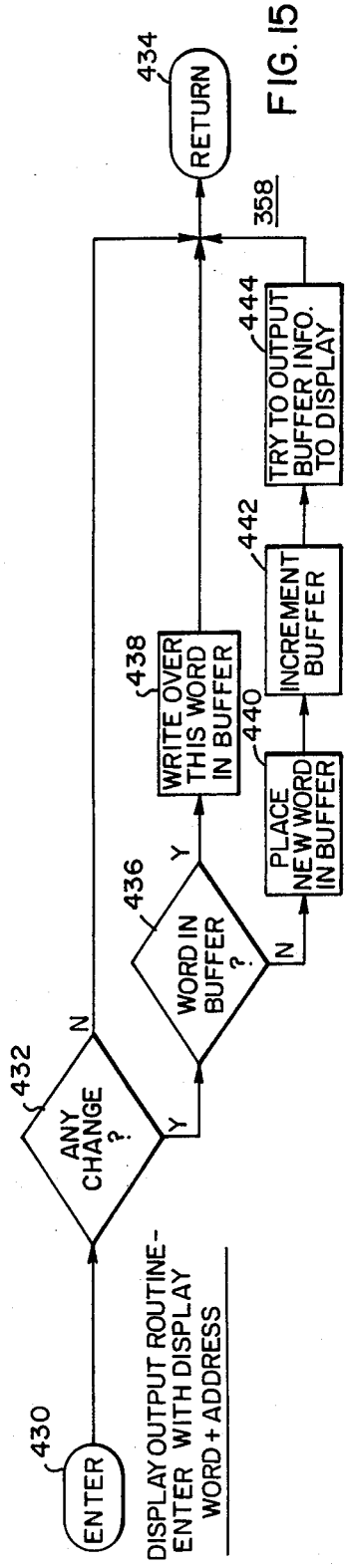

ELEVATOR BANK SIMULATION SYSTEM

A microfiche Appendix, consisting of 6 microfiche having a total of 320 frames, is included in the application.

BACKGROUND OF THE INVENTION

1. Field of the Invention:

The invention relates in general to elevator systems, and more specifically to an interactive, real time elevator system simulator with parameters variable from the display.

2. Description of the Prior Art:

Modern, high-speed elevator systems, such as those which serve office buildings and hotels, include some form of dispatcher strategy which makes traffic assignments to the various elevators cars of the elevator system, based upon the position and status of all of the elevator cars and the locations of the traffic requests. The dispatcher control conventionally utilizes hardware to detect the "events" considered by the dispatcher in its decision making process; the decision making logic control is conventionally hardwired, including hundreds of relays; and, the system input signals are conventionally received and processed by the dispatcher control in parallel to generate parallel output signals for control of the various elevator cars according to the specific logic hardwired into the dispatcher control.

With the development of reliable solid state control devices, the hardwired relay dispatcher control was, in some instances, replaced by the smaller solid state devices, but the dispatcher logic, once selected and designed into the control, was as inflexible as the relay type dispatcher control it replaced.

The next step in elevator control was the development of a programmable dispatcher. The programmable dispatcher, which includes a digital computer and software package, confines the decision making and operating strategy to the software package. Thus, the hardware may be substantially the same for each elevator installation. The specific strategy for each installation is tailored to the specific requirements thereof, and can be easily changed to accommodate changed usage of the buildings, or for any other reason.

The programmable dispatcher is more than a one-for-one replacement of its relay or hardwired counterpart, as it facilitates experimentation with modified as well as entirely dispatching strategies. The experimentation, however, must be carried out at an existing elevator installation, whic makes it inconvenient, and furthermore it is not possible to closely examine the consequences of software changes.

SUMMARY OF THE INVENTION

Briefly, the present invention is an elevator bank simulation system which includes a programmable dispatcher, a processor unit which receives commands and car assignments from the programmable dispatcher and generates the responses of the various elevator cars thereto, and a display panel for optically displaying the responses of the elevator cars of the elevator bank, in real time, as simulated by the processor. Predetermined traffic request patterns for the programmable dispatcher may be introduced from storage means, such as magnetic tape. This permits software changes to be made and the consequence of the change to immediately observed, as the operation of the elevator system in response to the introduced pattern of traffic requests is visually simulated in real time. A printer may simultaneously print out information relative to each traffic request, such as the time that the call was enterd, the time that the call was answered, and the specific elevator cars which answered the traffic request, to provide a record for comparision with other dispatching strategies.

The display panel includes, in addition to the illuminable display devices for simulating car position and motion, illuminable control means which may be actuated by an operator to introduce traffic requests into the system, as well as to set predetermined car and/or system conditions. Thus, the operator may directly interact with the programmable dispatcher, and observe in real time the consequences of his actions.

A parallel-to-serial data conversion in the processor unit relative to display panel data enables the display panel to be operated remotely from the processor unit and from the programmable dispatcher, and is thus useful as a marketing tool for displaying at any remote location which has a telephone, the operation of an elevator bank according to predetermined strategies, and for displaying the operation of the system with and without certain strategies available as options.

Remote operation of the display panel is reliable, even over a direct dial telephone link between the display panel and programmable dispatcher/processor unit due to a positive feedback information arrangement in which the processor unit builds or forms the true display panel image in its own memory. An instruction or traffic request initiated from the display panel is sent to the processor unit, and if the instruction is properly received the processor unit changes the panel image in its memory accordingly, and sends a serial data word back to the display panel which illuminates the lamp associated with the actuated control device on the display. The display panel is continuously updated by the processor unit to duplicate the image of the panel stored in its memory.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 3 illustrates an exemplary core map for the memory of the programmable dispatcher shown in block form in FIGS. 1 and 2;

FIG. 4 is a fragmentary view of the face of the display panel shown in block form in FIGS. 1 and 2;

FIG. 12 is a flow chart of an initialization subprogram which may be used in the software package associated with the processor unit;

FIG. 13 is a flow chart of a subprogram for receiving dispatcher and display interrupts, which may be used in the software package associated with the processor unit;

FIG. 15 is a flow chart of a subprogram for updating the display, which may be used in the software package associated with the processor unit; and

DESCRIPTION OF THE PREFERRED EMBODIMENTS

Figure 1:
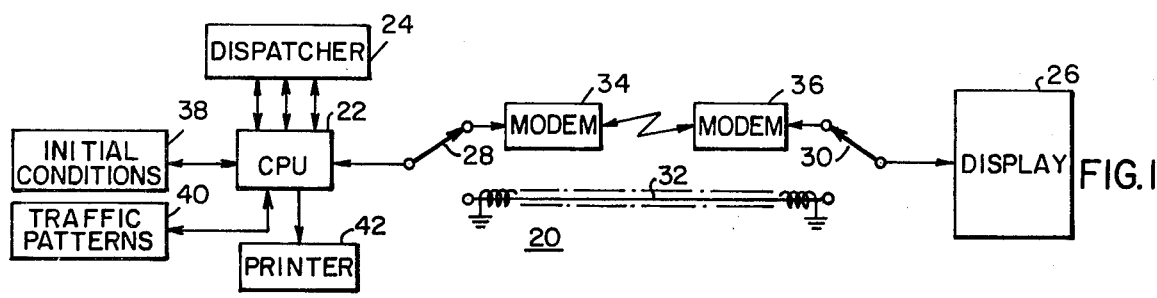
FIG. 1 is a block diagram of an elevator bank simulation system constructed according to the teachings of the invention.

Referring now to the drawings, and FIG. 1 in particular, there is shown a block diagram of an elevator bank simulation system 20 construted according to the teachings of the invention. The elevator bank simulation system 20 includes a central processor unit 22, dispatcher control 24, and a display panel 26. The processor 22 and display panel 26 include selector switches 28 and 30 respectively, which, in one positoin, enable the display panel 26 to be directly connected to the processor 22 via a twisted pair shown generally at 32, when the display panel is in the same location as the processor unit 22, and in another position to enable the display panel to be operated remotely, such as by a direct dial telephone link. Modems 34 and 36 located at the processor 22 and at the display panel 26, respectively, handle a two-way digital serial communication between the processor 22 and display panel 26.

The processor unit 22 is a digital computer. For purposes of example, a Westinghouse Electric Corporation 2500 minicomputer, which is a 16 bit general purpose computer, is used for processor unit 22, with the Program Listing One being a program listing for this minicomputer using SYMBAL VII programming language and language processor.

The dispatcher 24 is a programmable dispatcher, which includes a digital computer and software package for receiving car status data and traffic request information and developing assignments for a plurality of elevator cars to handle the traffic requests according to a specific strategy. For purposes of example, the programmable dispatcher which is completely disclosed and described in the following the United States patents and patents applications is used, which are all assigned to the same assignee as the present application. To eliminate unnecessary repetition, these patents and applications are hereby incorporated into the present application by reference.

The incorporated patents and applications are as follows:

(1) U.S. Pat. No. 3,750,850 issued Aug. 7, 1973 to C. L. Winkler et al, entitled "Floor Selector For An Elevator System", (2) U.S. Pat. No. 3,804,209 issued Apr. 16, 1974 to D. Edison, entitled "Elevator System", and (3) Application Ser. No. 340,615 filed Mar. 12, 1973 in the name of M. Sackin, entitled "Elevator System", now U.S. Pat. No. 3,851,734 issued Dec. 3, 1974.

U.S. Pat. No. 3,750,850 discloses a floor selector and other car control for operating a single elevator car. U.S. Pat. No. 3,804,209 discloses the modifications necessary to the single car control, and interface functions, for operating a plurality of elevator cars with a programmable dispatcher. U.S. Pat. No. 3,851,734 discloses a programmable dispatcher which provides assignments for the plurality of elevator cars in response to status signals received from the car controllers of the various cars and traffic requests from the corridor call control.

The programmable dispatcher 24 operates in the same manner as if it were communicating with the car controllers of a bank of elevator cars. The processor unit 22 functions as the car controllers for the bank of cars, receiving car assignments for the various cars, providing car status signals for the dispatcher control 24 and simulating car motion of the various cars in the associated building for operating the display panel 26.

Certain constants referred to as initial conditions, associated with the specific elevator system to be simulated, are entered into the appropriate locations in the software package of the processor 22, with this function being shown generally by block 38. This function may be provided by a keyboard. These initial conditions set forth, among other things, the number of elevator cars in the bank, parameters associated with the specific building, such as the number of floors, the distance between the floors, and special features such as the number of basement floors, the number of top extension floors, express zones, if any, convention floors, the lobby or main floor level, restaurant floor, and the like. Since the elevator bank simulation system 20 is a real time simulator, the initial conditions also include the parameters related to the movement of the elevator cars with respect to time, such as the rate of acceleration and the maximum velocity of the cars. Timer settings are also included, such as the normal door open time, as well as the values for system timers used to time events which may initiate predetermined dispatcher control strategies.

As will be hereinafter described, the display panel is an interactive display which permits direct operator input of traffic requests, such as car and floor calls, as well as permitting the operator to set predetermined signals relative to the elevator cars and system. In addition to providing information input to the simulation system 20 via the display panel 26, predetermined traffic patterns may be entered into the simulation system 20 via suitable storage means 40, such as magnetic tape. By introducing the same traffic pattern into the elevator bank simulation system, such as from a magnetic tape, the affect of changes in dispatcher strategy may be immediately observed, and the time required for the system to clear the calls may be determined by a stopwatch. The processor 22, in addition to providing signals for simulating car movement and the answering of traffic requests, which signals are displayed on the display panel 26, may also provide information for a printer console 42 which records parts of the displayed information and provides a permanent record of the times required to service the predetermined pattern of calls introduced by the storage means 40. This record may be compared with other records which were prepared in response to the same traffic pattern, but when using modified or new forms of dispatcher strategy.

Figure 2:
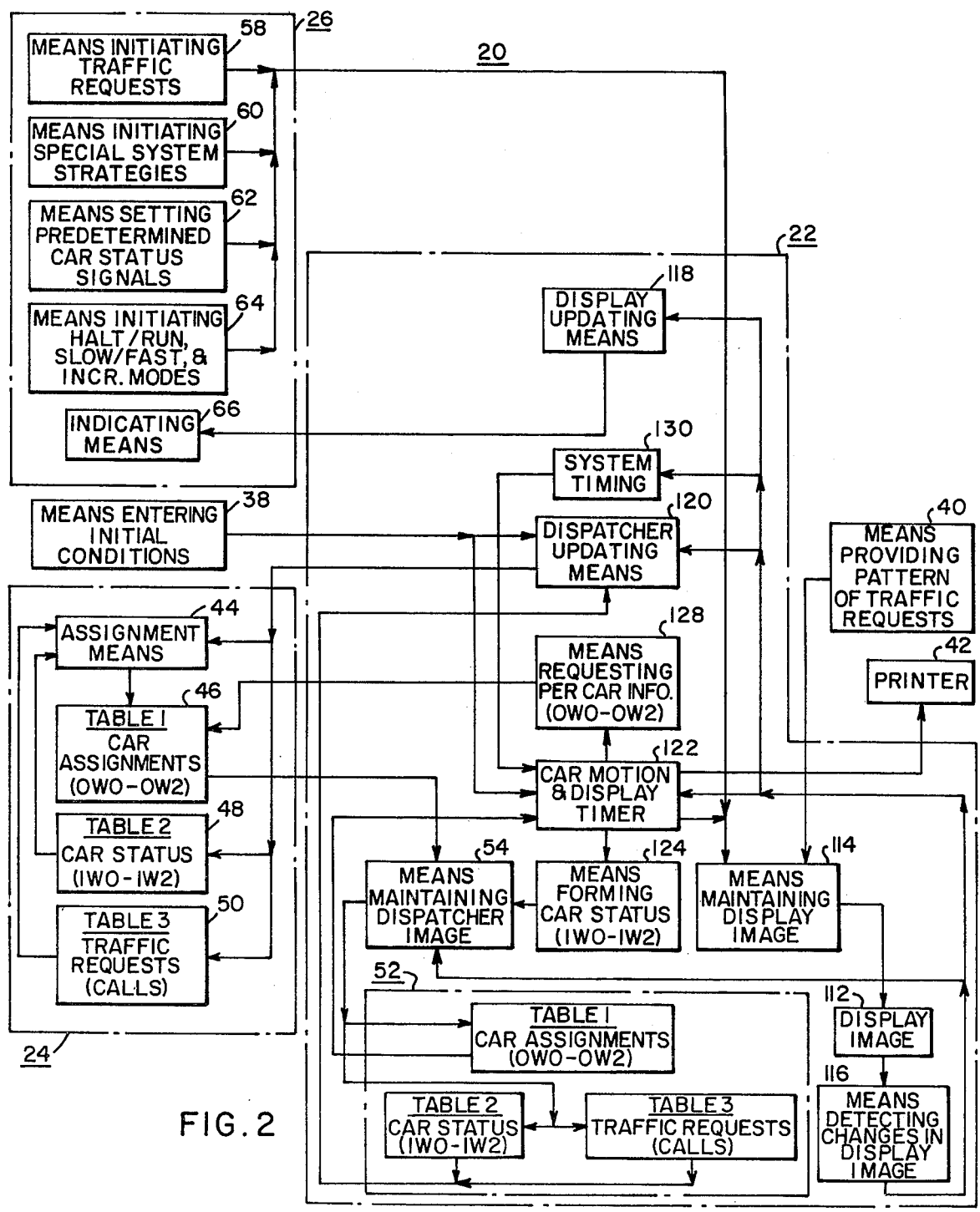
FIG. 2 is a detailed block diagram which indicates the functions of an elevator bank simulation sytem constructed according to the teachings of the invention.

FIG. 2 is a detailed functional block diagram of the elevator bank simulation system 20 shown in FIG. 1. The dispatcher 24 includes assignment means 44, and first, second and third tables 46, 48 and 50 respectively. FIG. 3 is a core map which gives by way of example the locations of these Tables in the memory of the dispatcher 24.

The word name is listed in the first vertical column of the core map shown in FIG. 3, the memory address of this word is listed next, and 12 bits of information relative to this word are then listed.

The first 128 addresses, only 6 of which are shown, are for traffic requests, ie., car and corridor calls, which memory locations are referred to as Table 3 in FIG. 2. This map illustrates a table for up to 128 floors, and for fewer floors the memory space may be reduced accordingly, and a scan counter will be set to scan through a lower number of scan slots before repeating, such as 16, 32 or 64 instead of 128. The car and corridor call word CL is followed by the basic scan slot number of each word. For example, word CL000 refers to scan slot zero, and it will contain call information relative to the floor level associated with scan slot zero. Car calls for up to 8 cars are arranged in bits 0–7 of each call word, and down and up corridor calls are arranged in bits 8 and 9, respectively. Thus, a car call in car A for scan slot 002, which may be associated, for example, with floor number 2, would appear in bit 0 of word CC002 at memory address 0000010, since bit zero is assigned to car A.

The car signals for car A, ie., words IW0, IW1, IW2, 0W0, 0W1 and 0W2 appear at the addresses listed in FIG. 3, with the bit location of the word in the memory being as illustrated. The signals for the remaining cars are then listed. Words IW0, IW1 and IW2 are status words for each elevator car, which words are normally provided by the car controllers of the various cars for the dispatcher control, and in the present application are provided by the processor unit 22. The status words IW0, IW1 and IW2 for each car are referred to generally as Table 2 in FIG. 2.

The signals and their description included in each status word are listed below:

| SIGNAL | DESCRIPTION |
|---|---|
| | STATUS WORD IW0 |
| SLDN | Car is in slowdown phase of run |
| BYPS | Car is bypassing corridor calls |
| $\overline{INSC}$ | Car is in-service with dispatcher control |
| UPTR | True when car is set up for travel |
| UPSV | True when car is set for up service |
| CALL | A car call is registered |
| CCAB | A car call above the advanced car position is registered |
| CCBL | A car call below the advanced car position is registered |
| DRCL | True when all doors are closed |
| $\overline{32L}$ | True when car is moving |
| AVAS | Car is available according to the floor selector |
| | STATUS WORD IW1 |
| AVP0–AVP6 | Advanced car position in binary |
| | STATUS WORD IW2 |
| ATSV | Car on attendant service |

-continued

| SIGNAL | DESCRIPTION |
|---|---|
| CREG | Car call is registered |
| $\overline{WT50}$ | Car load is greater than 50% of capacity |
| $\overline{WT75}$ | Car load is greater than 75% of capacity |

Words 0W0, 0W1 and 0W2 are assignment words, prepared for each elevator car by the dispatcher control 24 in response to the traffic requests in Table 3 and according to a logic arrangement which considers the car status words in Table 2. The assignment words 0W0, 0W1 and 0W2 are referred to generally as Table 1 in FIG. 2.

The symbols and their description included in the car assignment words for each car are listed below:

| SIGNAL | DESCRIPTION |
|---|---|
| | ASSIGNMENT WORD OW0 |
| $\overline{PARK}$ | Park command from dispatcher |
| MOD0 and MOD1 | Bits which select 1 of 4 floor address modes |
| TASS | Travel assigment — one up = up, zero = down |
| SASS | Service assignment — one = up, zero = down |
| FAD0–FAD6 | Floor address in Binary |
| | ASSIGNMENT WORD OW1 |
| $\overline{BSMT}$ | Basement assignment |
| $\overline{INUP}$ | A traffic pattern mode initiated by heavy up traffic |
| $\overline{MCCR}$ | Master car call reset |
| $\overline{CCAI}$ | Inhibits car calls from being answered |
| $\overline{DOPN}$ | Dispatcher command to open car doors |
| $\overline{DCLO}$ | Dispatcher command to close car doors |
| HLM0 and HLM1 | Bits which select 1 of 4 Hall Lantern Modes |
| | ASSIGNMENT WORD OW2 |
| $\overline{AVAD}$ | The car is available according to the dispatcher control |
| NEXT | Car is next to leave the main floor |
| $\overline{MNFL}$ | Main floor start signal from dispatcher control |
| $\overline{STT}$ | Special through trip |

The call words, CL, as well as the car signal words IW0–IW2 and 0W0–0W2 may be placed in the memory of the dispatcher 24, or retrieved therefrom, via a direct memory access channel between the dispatcher 24 and the central processor 22, if desired.

The central processor 22 includes an image 52 of Tables 1, 2 and 3, which is maintained by means 54.

The display panel 26 includes means 58 initiating traffic requests, ie., car and corridor calls, means 60 for initiating special system strategies, means 62 for setting predetermined car status signals, means 64 for initiating predetermined display panel operating modes, and indicating means 66, such as illuminable display devices.

FIG. 4 is an elevational view of the operating face of display panel 26, which illustrates suitable devices for performing the functions listed in blocks 58 through 66 of FIG. 2. In the example of the display panel 26 shown in FIG. 4, there are 32 floor levels marked 1 through 32, and information for up to and including 8 cars is provided. Since the information relative to each car is similar, a vertical section of the panel through the per car information is removed in order to compress the size of the panel and to simplify the drawing.

The devices having the square configurations shown on the face of panel 26 indicate illuminable pushbuttons, while the devices having the circular configuration indicate illuminable devices, such as lamps.

The information relative to each elevator car of the simulated bank appears in vertical columns between the legends or headings set forth on the face of the display which identifies the car. For example, the information relative to car A appears between the vertically spaced headings "Car A-Car A". Since the information for each car is similar, only the information relative to car A will be described in detail.

The vertical spacing between the headings for car A is divided into 40 rows, with the upper 32 rows pertaining to floor related information. These 32 rows are identified by the numbers 1 through 32 which appear under the legend "Floor No.". The per floor information is divided into three categories which indicate:

(1) If the car has a car call for that floor
(2) If the advanced car position is currently at that floor
(3) If this floor is included in the assignment given to this car by the dispatcher control 24.

These three bits of information respectively appear in the first, second and third vertical columns headed "CAR CALL", "LOC" and "ASG", which legends are located immediately below the car identification legend. The first vertical column heated "car call" includes 32 illuminable pushbuttons, one for each of the 32 floor levels, such as pushbutton 70 for floor level 5. The user may enter car calls for car A for any of the 32 floors by depressing the desired pushbutton, or pushbuttons. As will be hereinafter explained, the actuated pushbutton is not automatically illuminated by the act of depressing the button. The actuated button is noted by the display panel control and the information is sent to the processor unit 22. When the processor unit 22 records this event, the processor 22 sends a signal to the display panel 26 which illuminates the actuated pushbutton. This positive feedback is important, especially when the display panel 26 is operated at a point remote from the processor 22 as remote operation is subject to transmission noise and errors. When the actuated pushbutton is illuminated, the user knows that the traffic request has been received by the processor unit 22. When the car call is served by the elevator car, as noted by the processor 22, the lamp illuminating the associated pushbutton will be turned off by the processor.

The second vertical column, ie., the column headed "LOC" includes a lamp for each floor level and identifies the floor of the advanced car position. When the car is stopped at a floor, the actual and advanced car positions are the same, and a lamp is this column associated with the floor level at which the car is stopped will be illuminated by a signal from the processor 22. For example, when the car is stopped at the fifth level, lamp 72 will be illuminated. When the elevator car is moving, the advanced car position will be ahead of the actual car position by a number of floors determined by the car speed and the spacing between the floors. The lamp illuminated when the car is moving indicates the floor at which the elevator car could make a normal stop if it were to be requested to make a stop. At this advanced car position changes, the lamps will be turned on and off by the processor 72 to indicate the movement of the elevator car through the simulated building.

The third column, ie., the column headed "ASG", includes a lamp for each floor level, which lamps identify the floors included in the assignment given to the associated car by the dispatcher control 24. For example, if floor level 5 is included in the car's assignment, lamp 74 will be illuminated by the processor 22. When an elevator car is not under control of the dispatcher, it automatically goes on through trip operation in which it can consider all down floor calls ahead of its travel direction when set for down travel (UPTR=0), and when there are no down calls it will travel to the lowest registered up call in the building and reverse its travel direction at this call. It will then consider all up corridor calls ahead of its upward travel direction. When there are no further up corridor calls it will reverse at the highest registered down floor call and will again consider down floor calls ahead of its travel direction. When the elevator car is not in-service with the dispatcher 24 (INSC=0), the lamps will be illuminated for the various floors according to the floors at which the elevator car could see corridor calls if they existed, according to the pattern just set forth.

When the elevator car is in-service with the dispatcher (INSC=1), the dispatcher controls the floors from which the elevator car can consider corridor calls. The dispatcher control provides assignments by selecting a floor address, which is set forth in signal FAD-0–FAD6, and then setting the floor address mode bits MOD0 and MOD1 to interpret the floor command according to the following truth table shown in Table I.

TABLE I

TRUTH TABLE FOR ASSIGNMENT MODE BITS

| MOD0 | MOD1 | Floors from which the elevator car can see corridor calls |
|---|---|---|
| 0 | 0 | None |
| 1 | 0 | Only FAD0–FAD6 Floor |
| 0 | 1 | FAD0–FAD6 Floor and Above |
| 1 | 1 | FAD0–FAD6 Floor and Below |

The service assignment signal SASS from the dispatcher control 24 sets the car for up service (UPSV=1) or down service (UPSV=0), which determines the service direction of the floor calls which can be considered from the floors enabled by the dispatcher. Thus, if a elevator car is inhibited from sealing all floor calls, none of the lamps under the column "ASG" will be illuminated. If a elevator car is given a single floor assignment, only the lamp associated with the floor defined by the address FAD0–FAD6 will be illuminated. The service direction of the floor call which can be considered from this floor is noted by first and second lamps 76 and 78, respectively, disposed in a row below the row associated with floor level 1, which row has tfhe legend "Hall Lanterns". If the car has an up service assignment (SASS=1), hall lantern indicator or lamp 76 will be illuminated, while if the car has a down service assignment, hall lantern indicator 78 will be illuminated. This is the normal mode for the hall lanterns, indicated by the hall lantern mode bits HLM0 and HLM1 both being a logic one. If the dispatcher 24 desires, this normal hall lantern mode may be overridden to implement certain strategies, according to Table II, which is a truth table for the Hall Lantern mode bits.

TABLE II
TRUTH TABLE FOR HALL LANTERN MODE BITS

| HLM1 | HLM0 | Definition |
| --- | --- | --- |
| 1 | 1 | Normal Operation |
| 0 | 0 | Inhibit illumination of both lanterns |
| 1 | 0 | Turn on down hall lantern |
| 0 | 1 | Turn on up hall lantern |

Corridor calls may be introduced into the simulation system by first and second vertical columns containing illuminable pushbuttons collectively headed by the legend "CORRIDOR CALL", and individually headed by the legends "UP" and "DN", respectively. The first column includes a pushbutton associated with levels 1 through 31, and the second column includes pushbuttons associated with levels 2 through 32. If the operator desires to enter an up corridor call from the fifth level, pushbutton 80 would be acutated. In a manner similar to that explained for car calls, when the processor 22 receives the request for an up floor call from the fifth floor, the processor 22 illuminates pushbutton 80, to acknowledge to the user that the traffic request has indeed been registered. In like manner, if the user wishes to enter a down corridor call from the fifth floor, pushbutton 82 would be acutated.

The means 62 shown in block form in FIG. 2 for setting predetermined car status signals includes the illuminable pushbuttons 84, 86, 88 and 90. Pushbuttons 84 and 86 are disposed in a row headed by the legend "LOAD" with pushbutton 84 including the specific legend "50" and pushbutton 86 including the specific legend "75". These pushbuttons may be actuated by the user to indicate specific car loads, with pushbuttons 84 and 86 corresponding to the car status signals $\overline{WT50}$ and $\overline{WT75}$, respectively. If the user wishes to set signal $\overline{WT50}$ true, indicating that the load in the car is 50% or greater, compared to its capacity, pushbutton 84 would be actuated. When the request is received by the processor 22, it is acknowledged by the processor sending a signal to the display panel 26 to illuminate pushbutton 84. In like manner, the user may set signal $\overline{WT75}$ to the true state, indicating a car load of 75% or greater, by actuating pushbutton 86.

Pushbutton 88 is headed by the legend "OS", which button, when actuated and acknowledged by the processor takes the car out of service, and the car is not considered by the dispatcher 24 when making assignments. Pushbutton 90 is headed by the legend "DSK", which button, when actuated and acknowledged by the processor 22 indicates to the processor that the doors on this car are stuck. The response of the strategy to this malfunction can then be observed. Additional pushbuttons may be provided to set other car status signals or conditions, or those shown may be assigned different functions than those described, if desired.

The means 60 shown in FIG. 2 for initiating special system strategies, is for adding features such as those which are often offered as optional items. Optional features, for example, are special basement strategies, convention floor features, night service feature, mid-building return (parking) and intense-up. These and/or other features may be added by actuating in appropriate illuminable pushbutton from those grouped under the legend "system timers". For purpose of example, only the intense-up feature is illustrated, which feature may be added to the strategy of the dispatcher by actuating pushbutton 92. Pushbutton 92 is illuminated by the processor 22 to acknowledge receipt of the request to add the intense-up feature. When the intense-up pushbutton 92 is illuminated, an elevator car leaving the main floor with 50%, or greater, load, will place the bank of cars on intense-up traffic by a timer. While this timer is actuated, the dispatcher strategy will be modified in a predetermined manner, such as by dividing the bank of cars into low and high zone cars, with high zone cars leaving the main floor responding to car calls for the high zone only, at least until the car makes its first stop for a corridor call.

Special corridor calls may be placed into the system by the illuminable pushbuttons grouped under the general legend "SPECIAL CORRIDOR BUTTONS". For example, pushbuttons 94, 96 and 98 which include the individual legends "TX", "ME" and "SB", respectively, may represent pushbuttons at the main floor for service to a top extension, to a middle extension, and to sub-basement floors, respectively.

In addition to the per car signals listed in the vertical columns associated with each car, a plurality of additional lamps, such as lamp 100, may be included to indicate when certain status and command signals are true. An illuminated lamp indicates to the user that the signal set forth by the associated legend is true. For purposes of example, indicating lamps are provided for status and command signals AVAS, AVAD, NEXT, STT, DOPN, INUP, UPSV, UPTR and SLDN.

Various display panel operating modes are controlled by a plurality of illuminable pushbuttons grouped under the legend "CONTROL". For purposes of example, pushbuttons 102, 104, 106, 108 and 110 are given the specific legends "ON", "RUN", "FAST", "SLOW" and "IC", respectively. Pushbutton 102, labeled "ON" controls the panel power. When pushbutton 102 is actuated the panel power is turned on and its pushbutton is illuminated by the panel power and is the only lamp on the display directly controlled by the display panel. When the display panel power is turned on, the processor 22 and dispatcher 24 are initialized by clearing all of the Tables and by clearing the display panel, and when the system is ready to receive "interrupts" ie., signals from external sources, such as entered from the display, the run light associated with pushbutton 104 is flashed. Now, any combination of pushbuttons may be actuated to establish an initial pattern of traffic requests, as well as setting certain car status signals. When the conditions are established, the "run" pushbutton 104 is actuated to start the system into operation, displaying in real time the operation of the simulated bank of elevator cars as they go about their assignments to service the traffic requests. Depressing the pushbutton 104 when it is illuminated performs the "stop" function. Traffic requests and car status signals may be entered into the system at any time while the display is operating, by actuating the appropriate pushbutton.

Additional display panel operating modes may relate, for example, to the relationship of the display operating time to real time. For example, when pushbutton 106 is actuated and acknowledged by the processor 22, by the illumination of the pushbutton, the display goes into a fast operating mode which displays the response of the elevator system, but at a speed which is a predetermined percentage greater than real time, such as 50% faster, or 100% faster, as desired. When this pushbutton is again actuated, the system returns to real time.

When pushbutton 108 is actuated and acknowledged by the processor 22 by illuminating the pushbutton, the display goes into a slow mode, operating at a speed which is a predetermined percentage slower than real time such as 50% of real time. When pushbutton 108 is again actuated, the system returns to real time.

When both the "fast" and "slow" pushbuttons 106 and 108, respectively, are actuated simultaneously, the display operates in an incremental mode. In the incremental mode, the system operates in real time for a predetermined period of time and then freezes the system into the condition which exists at the end of this time. The system may then be restarted for an additional increment of time by actuating the "run" button. Reactuating pushbutton 106 and 108 simultaneously, returns the system to normal real time, as opposed to the incremental real time operating mode.

Pushbutton 110, when actuated, returns the system to some predetermined initial condition. The remaining pushbuttons under the heading "CONTROL" may be connected to provide other initial conditions when actuated. For example, actuating pushbutton 110 may clear the panel and then introduce a predetermined pattern of calls, without the necessity of the user entering this pattern of calls one at a time.

Figure 5:
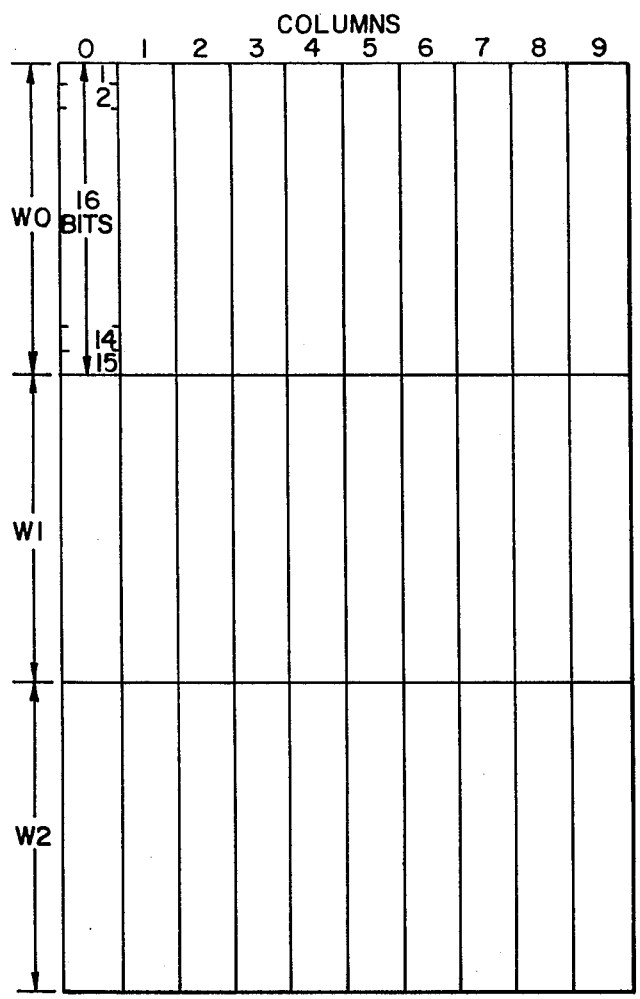
FIG. 5 is a diagram which illustrates the various data words which control the state of the illuminable display devices which appear on the face of the display panel shown in FIG. 4.

Returning to FIG. 2, the processor 22, in addition to maintaining an image 52 of the dispatcher core map, also maintains an image 112 of the display panel. Image 112 is the true display, with the display panel 26 merely being updated to correspond to this image. The image 112 is in the form of a plurality of 16 bit words, with each bit of each word being associated with a specific lamp. A "one" indicates the lamp is "on", and a zero indicates the lamp is "off". FIG. 5 illustrates an image format which may be used containing 10 columns headed 0 through 9, and 48 rows. Each column thus has 48 bits, with these 48 bits being divided into first, second and third 16 bit words, referenced W0, W1 and W2, respectively. Thus, each lamp in the display is identified by a column number, a word number, and a bit number. If desired, a single bit of a word may refer to more than one lamp by including another signal which refers to the specific lamp function. For example, one bit may refer to three lamps associated with car A for floor No. 32, ie., CAR CALL, LOC and ASG. The specific lamp would be identified by signals which pick out one of these three functions.

Instead of addressing each lamp individually, it is more convenient to address 16 lamps simultaneously, ie., to send a complete 16 bit word even though the condition of only one lamp of the word is to be changed. Referring to FIG. 4, if the 16 bits 0–15 of word W0 of column 0 are associated with the lamps which illuminate the car call pushbuttons for floors 32–17, respectively, the actuation of the car call pushbutton for the 32nd floor level would result in word W0 of column 0 being sent to the processor with bit 0 set to a 1, and with other bits being 0. This would be directed to the image 112 via means 114 which maintains the display image, and bit 0 of word W0 of column 0 would be set to a one. Means 116 detects changes in the display image 112 and upon detecting the changed bit in word W0 would send word W0 of column 0 as it appears in the display image 112 to the display updating means 118, which in turn sends the word to the display panel 26. When the display panel 26 receives the word, the lamp associated with the actuated pushbutton on the display is illuminated.

Means 116 also detects changes in traffic requests, ie., the car and corridor calls, and sends the changes ie., new calls and call resets, to the means 54 for maintaining the dispatcher image, to record the change in Table 3 thereof. The change in Table 3 of the dispatcher image is communicated to the dispatcher updating means 120, which updates Table 3 of the dispatcher 24.

The position and status of each of the elevator cars is developed by the car motion and display timer function 122, which places the cars at some predetermined position upon system start-up, such as at the main floor. Means 124 forms the car status words IW0, IW1 and IW2 for each car, places these words in Table 2 of the dispatcher core map image 52, and the dispatcher updating means 120 updates Table 2 (function 48) of the dispatcher 24. Thus, when a traffic request is entered into Table 3 (function 50) the assignment means 44 develops the assignment words 0W0, 0W1 and 0W2 for each of the in-service elevator cars based on the specific traffic requests and the status signals of all of the cars. The car assignment words are placed in Table 1 (function 46). The processor 22 periodically updates the display 26, with the car motion and display timer function 122 requesting, via function 128, that the latest car assignment words 0W0, 0W1 and 0W2 be sent to the processor 22 to update Table 1 of image 52, and enable the car motion and display timer function to operate with the latest car assignment information.

The car motion and display timer function 122 receives its timing from a system timing function 130, which determines the operating speed of the display simulation relative to real time, and whether or not the incremental mode has been selected. The system timing 130 and dispatcher updating means 120 are both responsive to means 116 which detects changes in the display panel image, with the system timing being responsive to the changes in the lamps associated with pushbuttons associated with the legend "CONTROL" in FIG. 4, and with the dispatcher updating means 120 being responsive to the changes in the lamps associated with optional system strategies. Car motion and display timer function 122 is responsive to panel changes relative to car status signals, to properly inform the means 124 which prepares the car status words IW0/–IW2 of the latest information.

The car motion and display timer 122 provides words for the printer 42, if used.

The means 38 for entering initial conditions enters them into the car motion and display timer function 122, so the proper car speed and floor spacing is established, and into the dispatcher updating function 120 to set the building parameters and special conditions such as the number of cars, number of floors and special features such as basement and top extension floors.

The auxiliary means 40 for providing a pattern of traffic requests, initiates them by introducing them into the means 114 for maintaining the display image, since changes in the display image initiate the functions necessary to accommodate the traffic requests.

Figure 6:
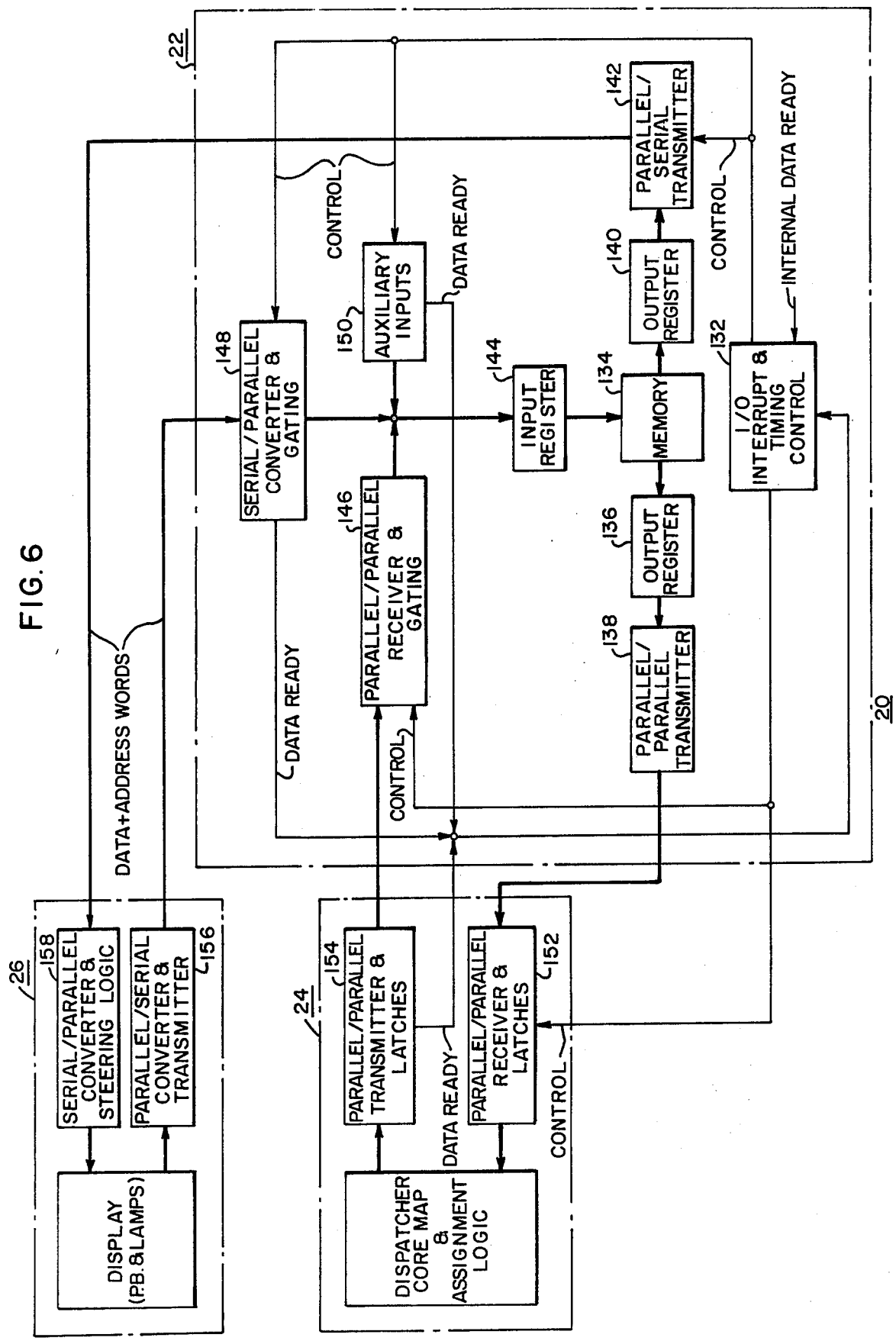
FIG. 6 is a partially schematic and partially block diagram which illustrates the various hardware items of an elevator bank simulation system constructed according to the teachings of the invention.

FIG. 6 is a block diagram of the elevator bank simulation system 20, which functionally illustrates the hardware involved in the exchange of information between the processor 22, dispatcher 24, and display 26. The processor 22 is in complete control of the system, providing the signals which control the transfer of data into and out of the processor. The heart of the processor is the I/O interrupt and timing control 132 which receives all input/output requests and provides the signals which control orderly flow of I/O data into and out of the memory 134.

The data flow between the dispatcher 24 and processor 22 is on a parallel basis, while the data flow between the processor 22 and display panel 26 is on a serial or time multiplexed basis, permitting remote operation of the display panel, such as via a direct dial telephone.

The processor 22 includes a memory 134 which stores all information, including the image 52 of the dispatcher core map and the display image 112, as hereinbefore set forth relative to FIG. 2. Data from the memory 134 destined for the dispatcher 24 is sent in parallel to an output register 136, and then to a suitable parallel to parallel transmitter 138. Data from the memory 134 destined for the display panel 26 is sent in parallel to an output register 140 and from there to a parallel to serial transmitter 142.

Data for the memory 134 is input via an input register 144. The input register 144 may receive data from many sources. For example, data from the dispatcher 24 is received in a parallel/parallel receiver and gating arrangement 146, data from the display panel 26 is received in a serial/parallel converter and gating arrangement 148, and all other inputs, such as from the keyboard and magnetic tape are lumped into the function 150 entitled "auxiliary inputs".

The dispatcher 24 includes a parallel/parallel receiver and latch function 152 for receiving information from the processor 22, and a parallel/parallel latch and transmitting function 154 for transmitting information to the processor 22.

Figure 7:
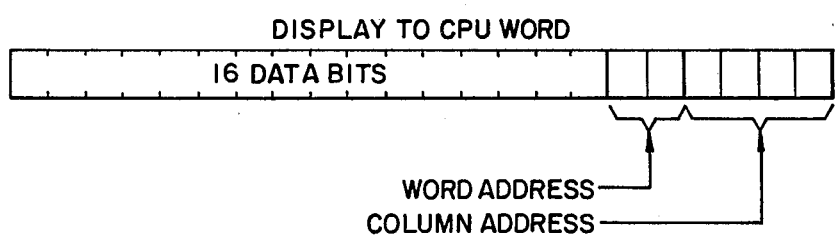
FIGS. 7 and 8 are diagrammatic representations of serial data words transmitted from the display panel to the processor, and from the processor unit to the display panel, respectively.
Figure 8:
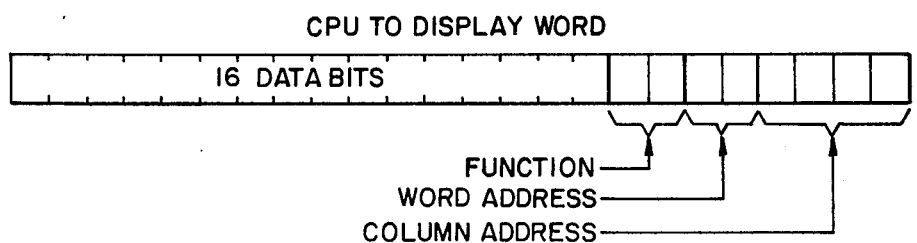

The display panel 26 includes a parallel/serial converter and transmitter function 156 for sending information to the processor 22, and a serial/parallel converter and steering logic function 158 for receiving information from the processor 22. While any suitable serial word format may be used, FIG. 7 diagrammatically illustrates the data word sent from the display panel 26 to the processor 28, and FIG. 8 diagrammatically illustrates the data word sent from the processor 22 to the display panel 26. As illustrated in FIG. 7, the word includes 16 data bits which indicate which pushbutton has been actuated, along with two bits which identify one of the 3 words W0, W1 or W2, and 4 bits which identify one of the ten columns 0 through 9. The word may also include a leading zero and a trailing one, along with an even or odd parity bit, so actual data words may be separated from line noise.

The data word shown in FIG. 8 which is sent from the processor 22 to the display 26 is similar to the format of the data words shown in FIG. 7, except it includes two additional bits for identifying the specific function each bit is meant to be associated with, ie., the car call function, the location function, or the assigned floor function. The steering logic associated with function 158 uses the function bits of the word shown in FIG. 8 to control the correct lamp of the three associated with each car for each floor level, as hereinbefore described relative to the display panel layout shown in FIG. 4.

Data ready signals from the various functions which send data to the memory 134 are directed to the interrupt and timing control 132, and the interrupt and timing function 132 selects whether it is to receive or send data, and the external device that it is to receive data from or to send data to. These signals for controlling the flow of data are referenced "control" in FIG. 6.

Figure 9:
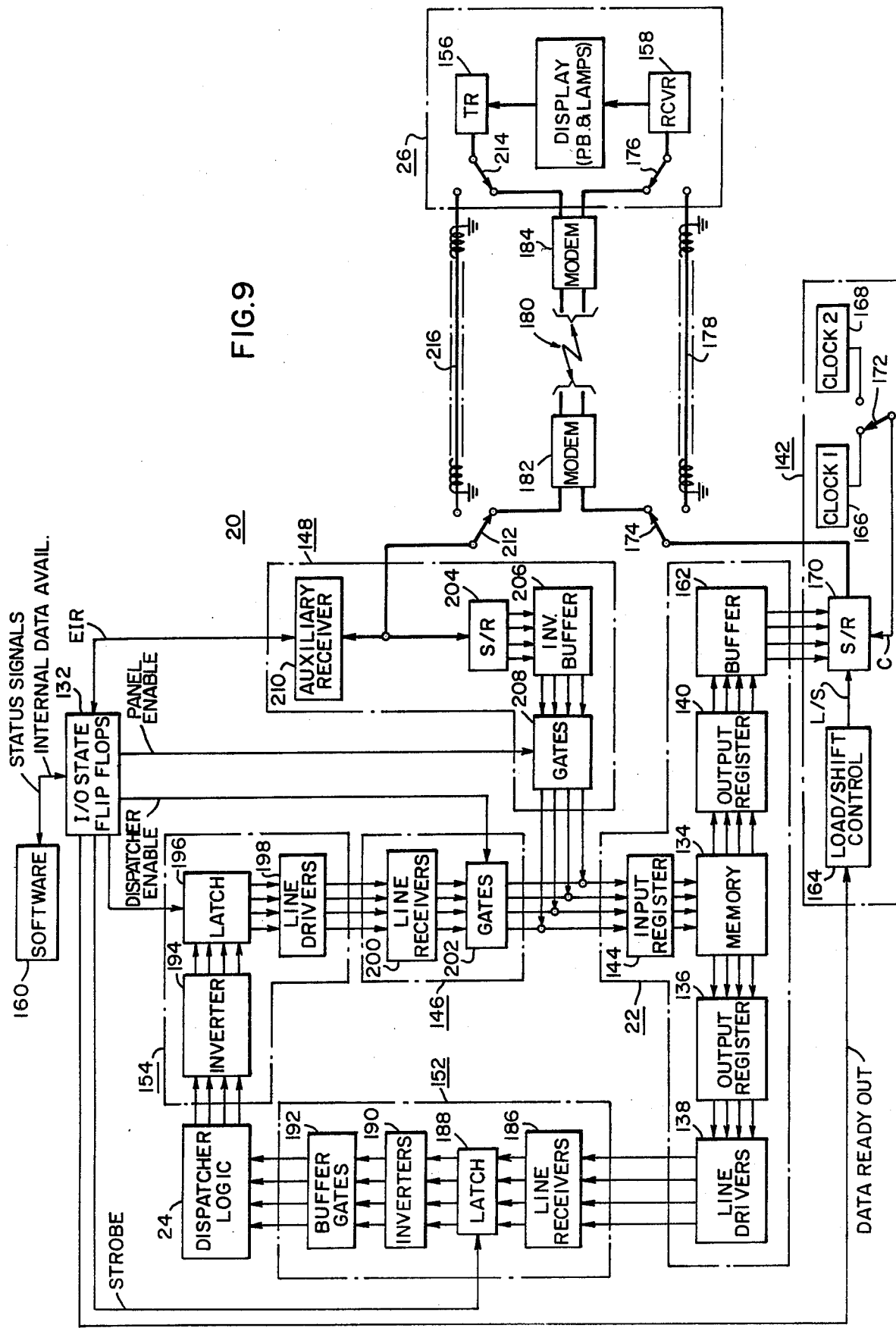
FIG. 9 is a partially schematic and partially block diagram which illustrates in detail the input and output circuits associated with the processor unit, the dispatcher control, and display panel.

FIG. 9 is a detailed block diagram of hardware for implementing the functions set forth in FIG. 6. The interrupt and timing control 132 is in the form of flip-flops, which are set to enable a predetermined transfer of data to or from the processor by commands from the software package shown generally at 160. The I/O flip-flops 132 provide status signals for software 160 as to the operating state of the I/O board.

Termination of an I/O transfer clears the flip-flops and they are ready for the next command from the software.

The memory 134, input register 144 and output registers 136 and 140 are part of the Westinghouse 2500 computer, which is used for the system processor 22. The line drivers 138 for sending data from the output register 136 may be Fairchild's 9614. The processor to display transmitter function, which takes data from output register 140 includes buffer gates 162, which may be Texas Instrument's SN 7407 open collector TTL buffers. The parallel to serial portion of the transmitter 142 includes load/shift control 164, first and second clocks 166 and 168, respectively, and parallel input, serial output shift register 170, such as RCA's CD4014AE. A switch 172 selectively connects one of the clocks 166 or 168 to the clock input of shift register 170. Clock 166 is a relatively low speed clock, such as 300 Hz., which is selected by switch 172 when the display panel is located remotely. The relatively slow data rate insures reliable transmission, even over direct dial telephone lines. Clock 168 is a higher speed clock, such as 6300 Hz, which is used to clock the transmitted serial data when the display 26 and processor 22 are directly connected via a twisted pair.

Switches 174 and 176 located at the processor 22 and display 26, respectively, select a twisted pair 178 for local transmission, or a telephone line 180 for remote transmission, via modems 182 and 184 located at the processor 22 and display 26, respectively. The display receiver 158, which is shown in detail in FIG. 11 and will be hereinafter described, receives the serial transmission from the selected transmission mode and steers the data to the proper addresses in the display panel.

The parallel/parallel receiver 152 located at the dispatcher 24 may include line receivers 186, such as Fairchild's 9615, latches 188, such as Texas Instrument's SN 74100, inverter gate 190, such as Texas Instrument's SN 7404, and buffer gates 192, such as Texas Instrument's SN 7438 NAND gate buffers.

The parallel/parallel transmitter 154 located at the dispatcher 24 may include inverter gates 194, such as Texas Instrument's SN 7404, latches 196, such as Texas Instrument's SN 74100, and line drivers 198, such as Fairchild's 9614.

The receiver 146 located at the processor 22 for receiving the parallel data from the dispatcher 24 includes line receivers 200, such as Fairchild's 9615, and gates 202, such as Texas Instrument's NAND gates SN 7401.

The receiver 148 located at the processor 22 for receiving the serial data from the display 26 and converting it to parallel transmission, includes a serial to parallel shift register 204, such as RCA's CD4015 AE, inverting buffers 206, such as RCA's CD4009A, and gates 208, such as Texas Instrument's NAND gates SN 7401. Receiver 148 also includes an auxiliary receiver 210 which detects the transmission of a valid word from the display panel 26 and notifies the I/O state flip-flop circuitry 132.

Switches 212 and 214 located at the processor 22 and display 26, respectively, select a twisted pair 216 for local communication, or the telephone 180 via the modems 182 and 184 for remote communication. The transmitter 156 at the display 26 is shown in detail in FIG. 10, and will be hereinafter described.

The control signals to and from the I/O state flip-flop circuitry 132 in FIG. 9 will be hereinafter described when describing the general overall operation of the elevator bank simulation system 20.

Figure 10:
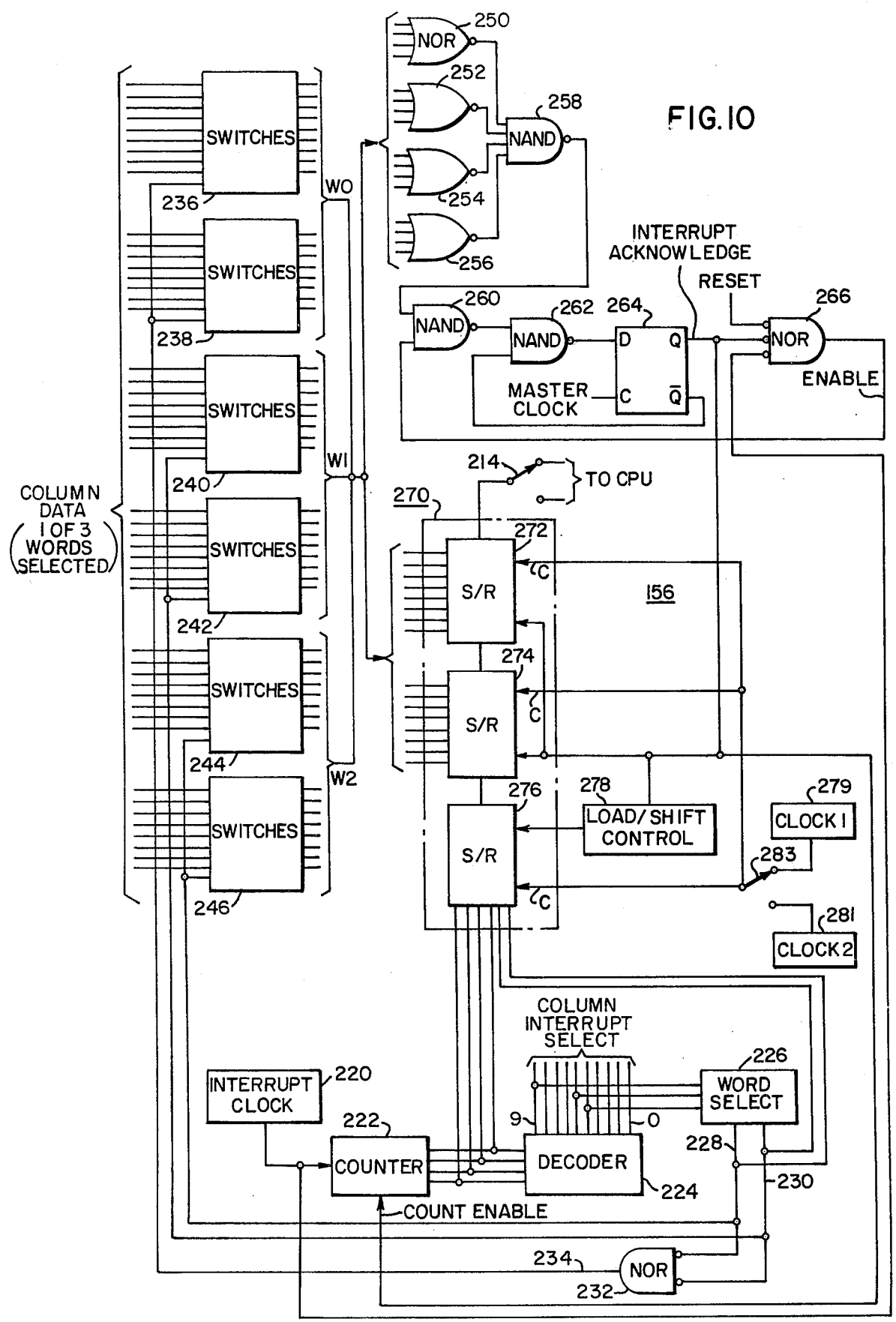
FIG. 10 is a partially schematic and partially block diagram of the transmitter portion of the display panel.

FIG. 10 is a partially schematic and partially block diagram of the transmitter 156 located at the display 26 for transmitting words which contain an interrupt request, which requests are initiated by the actuation of the pushbutton on the display, from the display 26 to the processor 22. See FIG. 7 for the format of this word. An interrupt clock 220 runs continuously at a predetermined frequency, such as 100 Hz. The output of the clock 220 is applied to a counter 222 such as RCA's CD4029A, which is set to count up from 0 through 9 in binary and then to reset to zero to start the next count cycle. A BCD to decimal decoder 224, such as RCA's CD 4028A, decodes the output of the counter to successively drive a different one of its ten output lines high, as the counter 222 advances through its count. These ten output lines, collectively labeled "column interrupt select" in FIG. 10, are connected such that each enables one of the ten columns of the display panel 26, which columns are diagrammatically illustrated in FIG. 5. Each column has 48 bits of information relative to the conditions of the pushbutton switches on the display, with each column being divided into three 16 bit words, W0, W1 and W2. The words are selected by decoding the outputs of lines 4, 5 and 9 of decoder 224 in word select decoder 226, which includes first and second output lines 228 and 230, respectively. Lines 228 and 230 are connected to the inputs of a dual input NOR gate 232, and the output of NOR gate 232 is connected to line 234. Word select decoder 226 is reset to provide zero outputs on its two lines 228 and 230 which drives line 234 high via the NOR gate 232. A high signal on line 234 selects word W0, and this line remains high while the column decoder 224 successively enables its lines 0 through 9. Once all the columns 0 through 9 have been enabled, line 230 goes high and this line selects word W1. When all the columns have been successively enabled, line 230 goes low and line 228 goes high to select word W2. Once all the columns have been enabled, word select 226 is reset to again provide zero outputs on its two lines 228 and 230, to repeat the cycle. Thus, word W0 is successively selected for columns 0 through 9, then word W1, and then word W2.

The 48 bits of each of the 10 columns are connected to the 48 inputs of the bilateral switches 236, 238, 240, 242, 244 and 246. Each of these switches, for example, may include two quad bilateral switches such as RCA's CD4016A. Line 234 is connected to enable switches 236 and 238, line 230 is connected to enable switches 240 and 242, and line 228 is connected to enable switches 244 and 246.

The outputs of switches 236 and 238 thus provide word W0 of columns 0 through 9, when word W0 is selected and the columns successively enabled. In like manner, the outputs of switches 240 and 242 provide word W1 of columns 0 through 9, and the outputs of switches 244 and 246 provide word W2 of columns 0 through 9. Each of the 16 bit words, W0, W1 and W2 are connected to an interrupt acknowledge circuit which includes four 4-input NOR gates 250, 252, 254 and 256, a four input NAND gate 258, two dual input NAND gates 260 and 262, a D type flip-flop 264, and a three input NOR gate 266. The 16 bit words are connected to the 16 inputs provided by the four 4-input NOR gates.

The 16 bits of each of the three words of the ten columns are all observed in 0.3 second, using a clock rate of 100 Hz. for clock 220, which is thus fast enough to pick up the actuation of any pushbutton on the panel while the user is in the act of depressing the button. When no pushbutton is actuated, all bits of information relative to the pushbuttons are at the zero logic level, and, as the different 16 bit words are applied to the inputs of NOR gates 250, 252, 254 and 256, the outputs of the gates will all be at the logic one level. The outputs of NOR gates 250, 252, 254 and 256 are connected to the inputs of the 4-input NAND gate 258. The output of NAND gate 258 is connected to an input of NAND gate 260 and the output of NAND gate 260 is connected to an input of NAND gate 262. The output of NAND gate 262 is connected to the D input of flip-flop 264. The $\overline{Q}$ output of flip-flop 264 is connected to the remaining input of NAND gate 262. The clock input is connected to a master clock which is used to keep all transfers of data in synchronism. The Q output of flip-flop 264 is connected to the count enable input of counter 222. As long as the Q output of flip-flop 264 is low, counter 222 is enabled and it will count through its preset range in synchronism with the interrupt clock 220. When the Q output of flip-flop 264 goes high it stops counter 222 on the count existing at that time. The Q output of flip-flop 264 is also connected to an input of NOR gate 266. Another input of NOR gate 266 is connected to the output of the interrupt clock 220. The remaining input of NOR gate 266 is connected to receive a master reset signal which is generated on the count following the transmission of a complete word from the panel to the processor. The output of NOR gate 266 is connected to the remaining input of NAND gate 260. As long as the Q output of flip-flop 264 is zero, NOR gate 266 will enable NAND gate 260, ie., provide a one, in synchronism with the interrupt clock 220. The count of counter 222 is advanced on each positive transition of the clock 220. Thus, each count exists while the output of the clock is a one, and while the output is a zero. The clock output thus goes to zero during the midpoint of each count. It is at this time ie., when the clock goes to zero, that the output of NOR gate 266 goes high to enable NAND gate 260.

If the output of NAND gate 258 is low during the time NAND gate 260 is enabled by NOR gate 266, the output of NAND gate 260 will be high. Since the $\overline{Q}$ output of flip-flop 264 is high, NAND gate 262 provides a low signal to the input of flip-flop 264, and the Q output of flip-flop 264 will be low. This low output enables the counter 222 to be advanced during each positive transition of the clock 220, and it enables NOR gate 266.

Assume now that the user despresses one of the pushbuttons shown in FIG. 4, to place a traffic request, or to request some other action to take place. While the user is depressing the button, the word associated with the button will be input to the NOR gates 250, 252, 254 and 256. The bit of this word associated with the actuated pushbutton will be at the one logic level, and the output of one of the NOR gates will go low. The output of NAND gate 258 will go high, the output of NAND gate 260 will go low, and the output of NAND gate 262 will go high. The next time flip-flop 264 is clocked by the master clock, which is a higher speed clock than the interrupt clock, such as 100 Khz., the Q output of flip-flop 264 will go high. The $\overline{Q}$ output of flip-flop 264 will go low to hold the output of NAND gate 262 high, and the high input from flip-flop 264 to NOR gate 266 will prevent NOR gate 266 from enabling NAND gate 260. The high Q output of flip-flop 264, which also may be referred to as the "interrupt acknowledge" signal, inhibits counter 222 and the counter will thus remain on the count which triggered the interrupt. Thus, the output of the decoder 224 is set to select the column in which the interrupt is located, the output of word select 226 is set to select the word of this column in which the interrupt is located, and this specific word is the word which is appearing at the outputs of the bilateral switches 236 through 246. The output words W0, W1, and W2 provided by the switches are each connected to 16 of the inputs of a parallel to serial shift register 270.

The parallel to serial transmitter control 156 of the display panel 26 is completed by the parallel/serial shift register 270 which includes a sufficient number of inputs to transmit the 16-bit data word appearing at the enabled outputs of the switches 236-246, along with the column and word addresses appearing at the outputs of counter 222 and word select decoder 226, respectively. For example, first, second and third 8-bit shift registers 272, 274 and 276, respectively, may be used, such as RCA's CD4014A. The 16-bits of actual data, ie., words, W0, W1 or W2 of the selected column, are connected to shift registers 272 and 274, while the word and column addresses are loaded into shift register 276. Control 278 is provided which is responsive to the interrupt acknowledge appearing at the Q output of flip-flop 264 to initiate the shifting of the shift register 270. First and second clocks 279 and 281 are provided, along with a switch 283 for selecting one of the clocks, for clocking the shift register 270 when its shift inputs are enabled. Clock 279 is a low speed clock, such as a 300 Hz. clock which is selected when the display 26 is remote from the processor 22, and clock 281 is a higher speed clock, such as 6300 Hz, which is selected when the display panel 26 is at the same location as the processor 22. Thus, when a pushbutton in the display panel is acutated an interrupt is created which stops the counter 222 precisely when the data word which contains the interrupt and the column and word addresses of the word, are already loaded into a parallel/serial shift register, and the interrupt initiates the serial transmission of the data to the processor 22. This transmission of the data word occurs without intervention of the processor 22, and the word is stored in the shift register 204 shown in FIG. 9, until the processor 22 is ready to receive it. At this point, the lamp which illuminates the depressed pushbutton has not been illuminated, as it is turned on by the processor 22.

Figure 11:
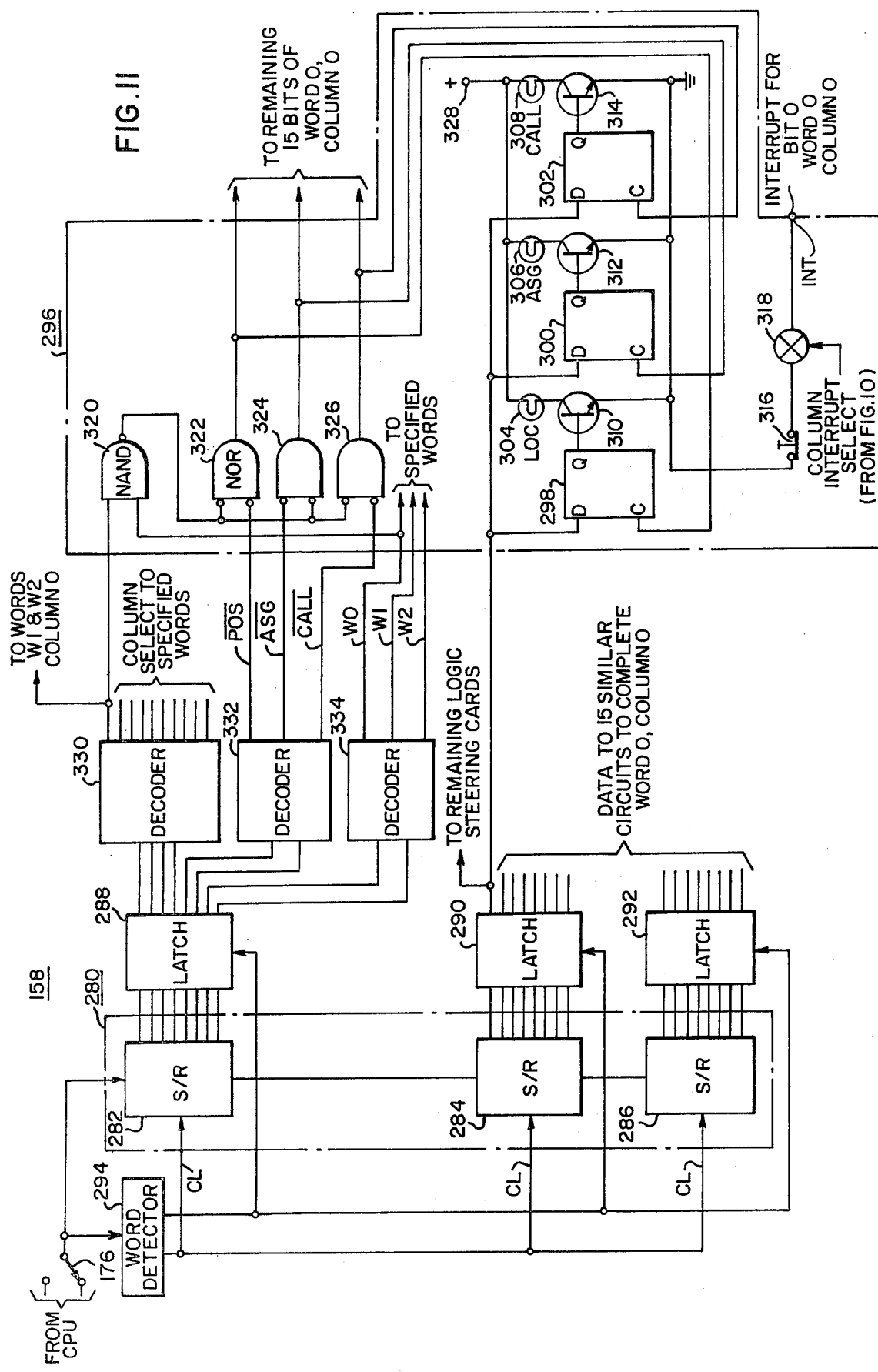
FIG. 11 is a partially schematic and partially block diagram of a receiver portion of the display panel.

FIG. 11 is a partially schematic and partially block diagram of the receiver 158 located at the display panel 26 for receiving words which contain information for turning the panel lamps on and off. See FIG. 8, for the format of this word.

Receiver 158 includes a serial/parallel shift register 280 which contains sufficient output lines to receive a complete word from the processor 22. For example, shift register 280 may include first, second and third shift registers 282, 284 and 286, respectively, such as RCA's CD4015A. The parallel outputs of shift registers 282, 284 and 286 are connected to latches 288, 290 and 292, respectively.

A valid word detector 294 detects the incoming word, such as by detecting a zero which precedes a word, and the word detector 294 then provides the clock pulses necessary to clock the correct number of bits into the shift register 280. If the parity checks, the word detector strobes the data held in the shift register 280 through the latches. Each of the 16 data bits held by latches 290 and 292 is connected to a logic steering circuit, such as logic steering circuit 296.

Logic steering circuit 296 includes first, second and third D type flip-flops 298, 300 and 302, such as RCA's CD4013AE, first, second and third lamps 304, 306 and 308, respectively, first, second and third NPN transistors 310, 312 and 314, respectively, a normally closed pushbutton 316, a bilateral switch 318, a two input NAND gate 320, three dual input NOR gats 322, 324 and 326, and a source of unidirectional potential represented by terminal 328.

The column, function and word information contained in the portion of the word received from the processor 22 which is held in latch 288 is decoded by decoders 330, 332 and 334, respectively. Decoder 330 is a BCD to line decoder, such as RCA's CD4028A, and decoders 332 and 334 are 2 to 4 line NAND-inverter gate decoders. Assuming for purposes of example that the steering circuit 296 is for bit 0 of word 0 in column 0, and the data word received from the processor is word 0 of column 0, output line 0 of column decoder 330 will be high as will output line W0 of word decoder 334. These two output lines provide the two inputs to NAND gate 320, and when they are both high the output of NAND gate 320 goes low to enable NOR gates 322, 324 and 326. The ouputs of decoder 332 which relate to position (POS), assigned (ASG), and car call (CALL) are connected to the remaining inputs of NOR gates 322, 324 and 326, respectively. Thus, one of the NOR gates will have a high output, depending upon which function the word from the processor 22 refers to. The outputs of NOR gates 322, 324 and 326 are connected to the clock inputs C of flip-flops 298, 300 and 302, respectively.

The output line of latch 290 associated with bit 0 of the 16-bit data word is connected to the D inputs of flip-flops 298, 300 and 302. The Q outputs of flip-flops 298, 300 and 302 are connected to the base electrodes of transistors 310, 312 and 314, respectively. Lamp 304 is connected in series with the collector-emitter electrodes of transistor 310, between source 328 of unidirectional potential and ground. In like manner, lamp 306 is connected in series with the collector-emitter electrodes of transistor 312, between source 328 of unidirectional potential and ground, and lamp 308 is connected in series with the collector-emitter electrodes of transistor 314 between the source 328 and ground. Lamp 304 is the "car location" lamp LOC for one of the floor levels, such as level 32, lamp 306 is the assigned lamp ASG for the same floor level, and lamp 308 is the car call lamp CALL for the same floor level. Thus, if the processor 22 wishes to turn on the car location lamp 304, for example, bit 0 will be a one, the output of NOR gate 322 will be a one, and the outputs of NOR gates 324 and 326 will be zero. The logic one output of NOR gate 322 will clock the logic one appearing at the D input of flip-flop 298 to its Q output, turning on transistor 310 to illuminate lamp 304. The conditions of lamps 306 and 308 will be unaffected, remaining on or off, as previously set.

If the processor 22 wishes to turn off the assigned lamp 306, for example, bit 0 will be at the logic zero level, the output of NOR gate 322 will be at the logic one level, and the outputs of NOR gates 322 and 326 will be at the logic zero level. The high output of NOR gate 324 will clock the logic zero appearing at the D input of flip-flop 300 to its Q output, removing base drive from transistor 312 to turn lamp 306 off.

Circuit 296 also provides one of the bits sent to the processor 22 when word W0 of column 0 has an interrupt, and is thus sent to the processor 22 as hereinbefore described relative to the display transmitter 156 shown in FIG. 10. Pushbutton 316 is the car call pushbutton for one of the floors, such as floor level 36. The column interrupt select lines from decoder 224 of FIG. 10 enables switch 318 over 3 times per second. If pushbutton 316 is depressed, terminal INT will not be grounded during the time word W0 of column 0 is enabled, and this will appear as a logic one level in bit 0 of this word, initiating the interrupt sequence described relative to FIG. 10.

The software package 160 shown in block form in FIG. 9 sets the I/O state flip-flops 132, to direct the orderly flow of information between the processor and peripheral equipment and it performs the functions of the individual car controllers shown in hardware form in the incorporated U.S. Pat. No. 3,750,850. FIGS. 12, 13, 14, and 15 are flow charts which set forth the more important functions of the software package. For detailed software implementation of the car motion and panel timer function, reference may be had to program listing ONE.

More specifically, when the "on" button 102 shown in FIG. 4 is depressed, it is immediately illuminated by the act of depressing the button if the panel 26 is functioning properly and is connected to a source of electrical potential. This action also initiates the program function shown in FIG. 12. This sub-program is entered at terminal 340 to start the processor 22. Step 342 clears the display panel 26 and locates the elevator cars on the display panel at a predetermined floor, or floors, such as the floor selected as the main floor. The processor 22 also forms the status words IW0–IW2 for the dispatcher 24. The dispatcher 24 prepares the assignment words OW0–OW2 for each of the elevator cars. When the display panel 26 is clear, the processor, in step 344, forms the processor to display words which flash the run light 104 to indicate to the user that the processor 22 is ready to receive external commands. Step 346 indicates that the processor 22 remains in an idle state, waiting for interrupts.

When the user depresses a pushbutton on the display panel 26, the transmitter 156 sends the word containing the interrupt to the processor receiver 148 shown in FIG. 9. The auxiliary receiver 210 detects when a valid word has been received and responsive thereto sends an external interrupt request signal EIR to the I/O state flip-flop circuitry 132. The flow chart of FIG. 13 is entered at terminal 348 in response to an external interrupt request, and step 350 of FIG. 13 identifies the source of the interrupt, as the EIR signal directs the program counter to a memory location which identifies the I/O board and the device which generated the request. Step 350 will identify the interrupt as coming from the display 26 and step 352 sets up a buffer location in the memory for the specific number of words to be input, i.e., two 16 bit word locations for receiving the 22 bits of information. The display input flip-flop in I/O state flip-flop circuitry 132 shown in FIG. 9 is then set which provides the panel enable signal for gates 208, which gates the first word into the buffer location. The shift register 204 shifts the remaining portion of the data word into its output locations and the gates 208 are again enabled to load this word into the buffer. When the second word is shifted into the two word buffer location, the buffer is full and a buffer overflow signal is generated which terminates the transfer operation and clears the I/O state flip-flops of circuitry 132.

Step 354 of FIG. 13 maps the data word into the proper location of the display image 112 shown in FIG. 2, and step 356 calls the display output routine 358 to make the corresponding changes in the display panel 26. The display output routine 358 is shown in FIG. 15, and will be hereinafter described. At the present, it is sufficient to note that the display output routine transmits a word to the display panel 26 which illuminates the lamp associated with the actuated pushbutton, such as lamp 308 shown in FIG. 11, in the event pushbutton 316 was the button actuated by the user.

Step 360 determines the nature of the request from the panel. A traffic request, or other request which affects the dispatcher is directed to step 362. A request from the "control" portion of the panel which does not affect the dispatcher, such as the display speed relative to real time, is directed to step 370 which implements the change. This implementation will be hereinafter described when discussing FIG. 14.

The data received from the display and entered into the display image is also directed by step 362 to the dispatcher image 52 shown in FIG. 2. For example, if the information from the panel was a traffic request, such as a car or corridor call, it will be entered into Table 3. Step 364 calls the dispatcher output routine 366 to send this data, such as a traffic request, to the dispatcher 24, which will in turn prepare car assignments for serving the request. This interrupt program is exited at terminal 368.

If step 350 determines that the interrupt was a data ready request from the dispatcher, which is always in response to a request from the processor 22 for the dispatcher to furnish the car assignment words OW-0–OW2, step 350 directs the program to steps 372 and 374. Steps 372 and 374 input the data into the dispatcher image 52 shown in FIG. 2, and also into the car motion and display timer function 122 shown in FIG. 2, which function initiated the request for dispatcher information via function 128, which is also shown in FIG. 2.

Figure 14:
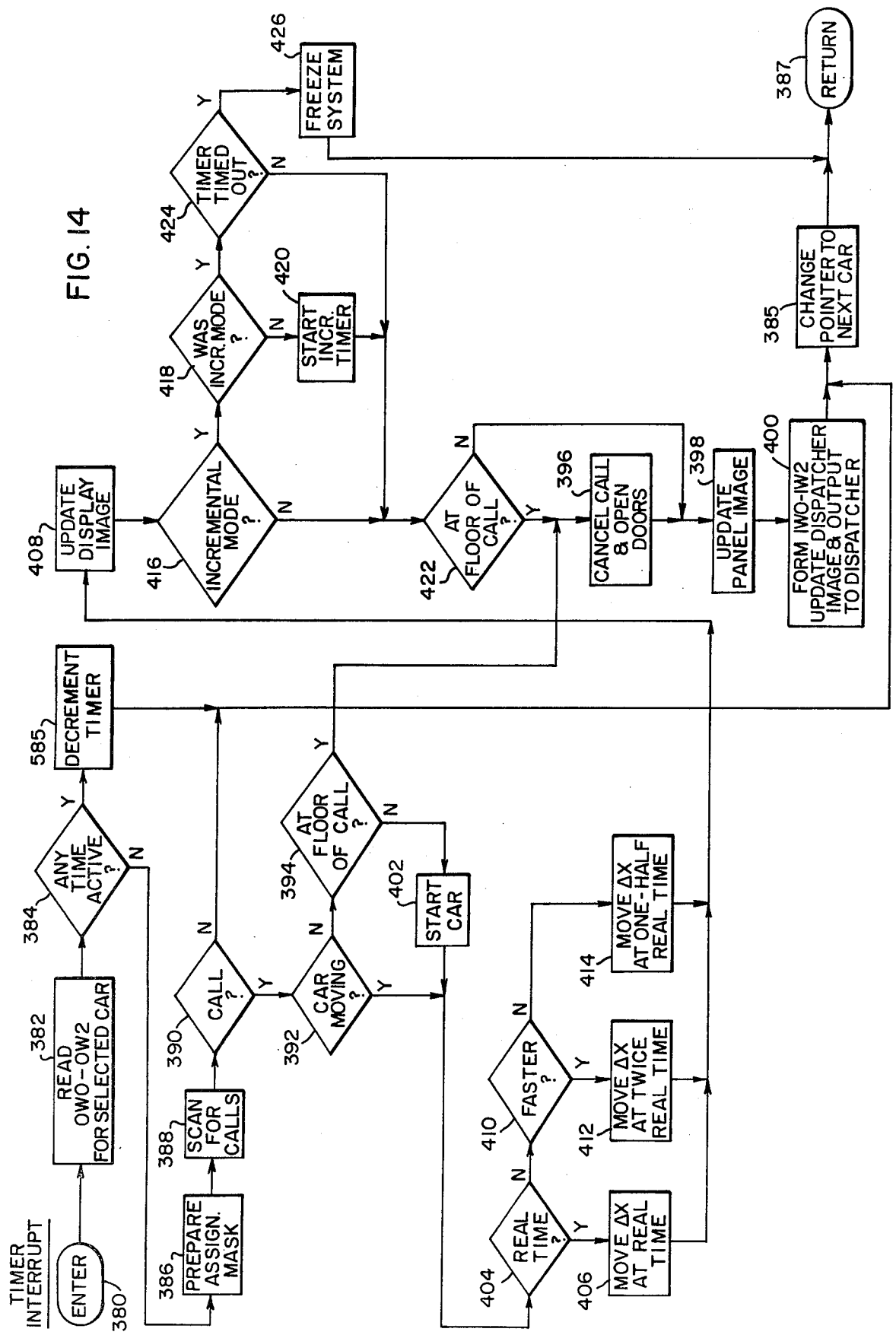
FIG. 14 is a flow chart of a subprogram which may be run in response to a timer interrupt to provide data for updating the panel and dispatcher images on a periodic timed basis.

FIG. 14 is a flow chart which illustrates the car motion and display timer function 122 of FIG. 2. This function is entered periodically, such as every 0.5 second by a timer interrupt from system timing 130 of FIG. 2 to provide frequent update of the display image 112 and display 26.

The flow chart of FIG. 14 is entered at terminal 380, and step 382 requests the dispatcher 24 to furnish the assignment words OW0–OW2 for a specific car of the system. Each car is considered separate, one after another, and as each car is considered its assignment words are requested and stored in the dispatcher image in order to obtain the latest assignment for each car. Step 384 determines if there is any timer active which indicates the car is stopped and not able to immediately respond to an assignment, such as a door non-interference time timer.

If such a timer is active it is unnecessary to look for calls or to update the car position and the program advances to step 585 which decrements the timer, and then to step 385 which changes a pointer to the next car to be considered. This portion of the program is then exited at terminal 387. If step 384 determines no such timer is active, step 386 utilizes the address of the assignment floor FAD0–FAD6 and the assignment interpretation bits MOD0 and MOD1 to prepare an assignment mask for the car, and step 388 uses the assignment mask to scan for calls listed in Table 3 of the dispatcher image 52. The service direction signal UPSV is used to establish the initial scan direction. If signal UPSV is at a logic one level, the scan starts at the car and proceeds upwardly from the car and will stop at any up call ahead which appears through the assignment mask. If none, the scan looks for down calls above the car, which appear through the mask. If none, the scan looks for down calls below the car which appear through the mask. If none, the scan looks for up calls below the car which appear through the mask. If the signal UPSV is at the logic zero level, the scan looks for down calls below the car, up calls below the car, up calls above the car, and down calls above the car, in that sequence.

Step 390 determines if any calls were found, actual, or artificial, such as a parking assignment. If none, the program advances to step 385.

If a call was found, step 392 determines if the car is moving. If the car is not moving, step 394 determines if the car is at the floor of the call. If it is, step 396 cancels the call and opens the door of the car. Step 398 updates the display image 112, and step 400 forms the car status words IW0–IW2 for this car, updates the dispatcher image 52, and updates the dispatcher 24. Step 385 changes the pointer to the next car to be considered, and the program exits at terminal 387.

If step 392 finds the car is not moving and step 394 finds that the car is not at the floor of the call, stop 402 starts the car and the program advances to step 404. If step 392 determines that the car is moving, the program also advances to step 404.

Step 404 checks the display operating modes selected by the user, by determining if the display is to be operated in real time. If the display is to be operated in real time, step 406 moves the car ΔX according to the time elapsed since the last update, and the rate of car movement. Step 408 updates the display image 112, which sets a flag which indicates that the display 26 should be updated.

If step 404 finds the panel is not be operated in real time, step 410 checks to see if the selected mode is faster or slower than real time. If faster, step 412 moves the car ΔX according to the fast mode, such as twice the rate of real time, and if slower step 414 moves the car ΔX according to the slow mode, such as one-half the real time rate.

After the display image is updated in step 408, step 416 determines if the display panel 26 is operating in the incremental mode. If the display is operating in the incremental mode, step 418 determines if the display was operating in the incremental mode the last time this portion of the program was run. If it was not, step 420 starts the timer which determines the increment of time which the program runs before freezing, and the program then advances to step 422.

If step 418 finds the display was in the incremental mode during the last running of the program, the incremental timer is checked in step 424 to see if it has timed out. If it has, step 426 freezes the system and exits the program at terminal 387. If the timer is still active, the program advances to step 422.

Step 422 checks to see if the ΔX movement of the car advanced the car to the floor of the call. If it has, step 396 cancels the call, opens the door, and advances the program to step 398. If the car is not at the floor of the call, the program skips step 396 and advances to 398, hereinbefore described.

Instead of determining the selected operating mode relative to real time within the car motion and display timer function, it would be equally suitable to use the specific operating mode to determine the timer interrupt interval which runs the car motion and display timer function. For example, if the timer interrupt interval for real time is 0.5 second, it would be changed to 0.25 second for twice real time.

FIG. 15 is a flow chart which sets forth the display output routine 358 referred to in FIG. 13. Each time the display image 112 is changed, a flag is set which identifies the specific word changed. The program is entered at terminal 430 and step 432 determines if there has been a change in the display image by checking the change flags. If there has been no change, the program returns to the main program via terminal 434. If a change is found, step 436 determines if a buffer, used to store data words and addresses waiting to be output to the display, has the same word awaiting such transmission. In other words, step 436 determines if a word having the same word number and column number had previously been changed and placed in the buffer to be output to the display 26, but has not in fact been outputted from the buffer to the display. If step 436 finds the same word address in the buffer, step 438 writes the updated word over the old word in the buffer, and the program exits at terminal 434.

If the same word address is not found associated with a word in the buffer, or there are no words in the buffer, step 440 places the new word in the buffer, step 442 increments the buffer or places the buffer pointer to the next location, step 444 attempts to output the words in the buffer to the display, and the program is exited at terminal 434.

A brief review of the operation of the elevator bank simulation system 20, referring primarily to FIG. 9, will illustrate the controlled flow of input/output information between the processor 22 and the display panel 26, as well as the controlled flow of input/output information between the processor 22 and the dispatcher 24.

After the initial information is entered into the simulation system via the keyboard, shown generally at 38 in FIG. 2, and the display panel 26 is turned on by pushbutton 102, it will be assumed that the user places a down floor call from floor 32. This sets one of the bits in one of the panel words to a logic one, and when this word in the proper column is scanned by the scan counter 222 shown in FIG. 10, the logic one in the word stops the scan counter 222 and the word containing the logic one is immediately transmitted in serial form to receiver 148, either via the twisted pair 216, if the display is local, or via the direct dial telephone system 180, if remote. The word is stored in shift register 204, and the auxiliary receiver 210 notifies the I/O state flip-flop circuit 132 that a valid word has been received, via the signal EIR. When the processor 22 is ready to receive the data word, a panel enable signal applied to gates 208 transfers the data in parallel into the memory 134 via the input register 144.

The processor 22 updates the display image to show the call, and it forms an output word which contains a logic one at the appropriate bit which will turn on the lamp associated with the down pushbutton at floor 32. This word is put into output register 140 and the I/O state flip-flop circuit 132 is set to output the word to the display in response to an "internal data available" signal. A "data ready out" signal applied to the control 164 parallel loads and shifts the data out serially to the receiver 158 of the display 26. The illumination of the actuated pushbutton assures the user that the request has been received. This acknowledgment by the processor usually occurs so fast that there is little or no noticeable delay between the action of depressing the pushbutton and the lighting of its associated lamp.

The processor 22 then prepares a data word for the dispatcher to notify the dispatcher 24 of the traffic request. The word is output to the dispatcher and held in latch 188 of the dispatcher receiver 152, until the latch is strobed by a signal from the I/O state flip-flops, to introduce the information into the dispatcher memory with the proper timing.

When the system timer interrupt occurs to update the display image 112, and thus the display 26, the processor 22 requests that the dispatcher 24 provide input words IW0–IW2 for the specific car being considered. The dispatcher 26 places the information in the latch 196 and it is transmitted to the gates 202 of the processor receiver. The I/O circuit 132 is notified by the dispatcher that the data is ready for the processor, and the processor 22, when ready for the information, provides a dispatcher enable signal which gates the information into the input register 144 and into the memory location set up for the information in the memory 134. When all of the words from the dispatcher have been sent, the buffer overflow signal is provided which terminates the transfer and clears the I/O state flip-flop circuit 132.

The processor 22 now uses the assignment signals and call information to update the panel image as to the movement of any cars, to cancel any calls, and the like, and updates the display 26 as changes occur in the display image. The dispatcher is also updated as required.

In summary, there has been disclosed a new and improved interactive elevator bank simulation system which enables the operation of the bank of elevator cars to be observed in real time, using any desired strategy. The strategy is in the form of a software package, which enables the strategy to be changed, or modified, as desired, and the consequences of such modification may be immediately viewed on the display panel portion of the simulation system. The information flow between the central processing unit and the display panel is serial in form, permitting remote operation, even over direct dial telephone lines, which enable the display panel to be effectively used as a sales tool for demonstrating different strategies and optional features for consideration by the prospective user. In addition to viewing the operation of an elevator system according to any predetermined strategy, certain information relative to the operation of the system may be simultaneously recorded in permanent form, such as by a printer, to facilitate comparison between different operating strategies when using similar patterns of traffic requests.

We claim as our invention:

1. An elevator bank simulation system, comprising:
   display means,
   sequence controlling means,
   and dispatcher means,
   said display means including indicating means for visually displaying information relative to the operation of a simulated bank of elevator cars, and means for entering traffic requests,
   said sequence controlling means including the following components: (a) display updating means, (b) dispatcher updating means, (c) simulation means, and (d) status means,
   said display updating means being responsive to said traffic requests for providing signals for said display means which actuate said indicating means to visually display which traffic requests have been entered,
   said dispatcher updating means providing signals for said dispatcher means relative to said traffic requests and to the status of the elevator cars of the simulated bank,
   said dispatcher means including assignment means responsive to the signals provided by said sequence controlling means for developing assignment signals for the elevator cars of the simulated bank according to a predetermined strategy,
   said simulation means being responsive to the assignment signals for simulating the response of the elevator cars to the assignment signals and for canceling traffic requests as they are served by the elevator cars,
   said status means being responsive to the simulation means for providing signals for the dispatcher means indicative of the status of the elevator cars,
   said display updating means providing signals for said display means which actuate said indicating means to visually display the simulated response of the elevator cars and the answering of traffic requests.

2. The elevator bank simulation system of claim 1 wherein the means for entering predetermined traffic requests associated with the display means includes a plurality of switching means for entering simulated corridor calls.

3. The elevator bank simulation system of claim 1 wherein the means for entering predetermined traffic requests associated with the display means includes a plurality of switching means for entering simulated car calls.

4. The elevator bank simulation system of claim 1 including storage means for entering traffic requests.

5. The elevator bank simulation system of claim 1 wherein the display means includes means serializing the traffic requests, and the sequence controlling means includes the following additional component: (e) means which serialize the signals provided by the display updating means for transmission to the display means, facilitating remote and portable operation of the display means.

6. The elevator bank simulation system of claim 5 including modem means for establishing a direct dial telephone communication link between the display means and the sequence controlling means.

7. The elevator bank simulation system of claim 5 including means for establishing first and second communication links between the display means and the sequence controlling means, with the first link being a direct, local link, and with the second link being a remote communication link, and means for selecting one of the first and second communication links.

8. The elevator system of claim 5 including first and second clock means for clocking the data over the first and second communication links, respectively, with the clock rate of the first clock means exceeding that of the second clock means.

9. The elevator system of claim 1 wherein the means for entering traffic requests includes at least one switching device, which, when actuated, sets the elevator bank simulation system to a predetermined state.

10. The elevator bank simulation system of claim 1 including means for entering constants into the simulation system, including the number of elevator cars in the bank of elevator cars, and the number of floors to be served by the bank of elevator cars.

11. The elevator bank simulation system of claim 1 including means for entering constants into the simulation system, including parameters related to the desired movement of the elevator cars with respect to time, and the distance between the floors of the simulated structure, and wherein the simulation means of the sequence controlling means uses these parameters when simulating the response of the elevator cars to the assignment signals such that the time required for the elevator cars of the simulated bank to move between floors and to serve the traffic requests is substantially the same as in an actual elevator system having these same parameters.

12. The elevator system of claim 11 wherein the display means includes means for selecting a response time for the elevator system which is a predetermined percentage of the response time of an actual elevator system having the same parameters as those entered into the simulation system.

13. The elevator system of claim 11 wherein the display means includes means for initiating an incremental operating mode wherein the simulation system operates for a predetermined period of time and then freezes the system to that existing at the end of said predetermined time.

14. The elevator system of claim 1 wherein the indicating means and means for entering traffic requests associated with the display means have predetermined addresses including word, column and bit numbers, and wherein the sequence controlling means includes the following additional component: (e) memory means in which an image of the display means is maintained, and wherein the signals provided by the display means and processor means for one another include signal words which have an address portion in addition to a data portion.

15. The elevator bank simulation system of claim 1 wherein the sequence controlling means includes the following additional components: (e) memory means, and (f) means for maintaining an image of the display means in said memory means, with the display updating means of the sequence controlling means providing signals for updating said display means in response to a change in the image of the display means maintained in said memory means.

16. The elevator bank simulation system of claim 1 wherein the dispatcher means includes means maintaining a first table of signals indicative of the status and assignment of each of the elevator cars, and a second table listing the traffic requests entered at the display means, and wherein the sequence controlling means includes the following additional components: (e) memory means, and (f) means maintaining an image of the first and second tables in said memory means.

17. The elevator bank simulation system of claim 16 wherein the sequence controlling means includes the following additional component: (g) means maintaining an image of the display means in the memory means, with the display updating means of the sequence controlling means providing signals for updating said display means in response to a change in said image of the display means.

18. The elevator bank simulation system of claim 1 wherein the dispatcher means includes means maintaining and updating a first table of signals responsive to the assignment signal for each of the elevator cars of the simulated bank provided by the dispatcher means, means maintaining a second table of signals indicative of the status of each of the elevator cars, and means maintaining a third table of signals which contains traffic requests, and wherein the sequence controlling means includes the following additional components: (e) means providing an image of said first, second and third tables, (f) means accessing the first table of the dispatcher means to update said image of the first table, (g) means establishing the signals in said second table in response to the means simulating the response of the elevator cars to the assignment signals, (h) means establishing signals in said third table in response to traffic requests received from the display means and the canceling of traffic requests, and (i) means responsive to changes in the image of the second and third tables for updating the second and third tables of the dispatcher means.

19. The elevator bank simulation system of claim 1 wherein the indicating means and means for entering traffic requests associated with the display means have predetermined addresses including word, column and bit numbers, means sequentially scanning said words of the display means until a traffic request is entered which changes a bit of one of the words, means serially transmitting the word associated with the traffic request to the sequence controlling means, storage means storing the word at the sequence controlling means until the sequence controlling means is ready to read the word, and wherein the sequence controlling means includes the following additional components: (e) memory means, and (f) control means for providing the signal for said storage means which transfers the word to said memory means.

20. The elevator bank simulation system of claim 1 wherein the indicating means and means for entering traffic requests associated with the display means have predetermined addresses, including word, column and bit identification, and wherein the sequence controlling means includes the following additional components: (e) means for storing an image of the display means, including the same word, column and bit identification, and (f) buffer means for storing words provided by the display updating means until the words are sent to the display means.

21. The elevator bank simulation system of claim 20 wherein the sequence controlling means includes the following additional components: (g) comparator means comparing the address of a signal word provided by the display updating means with the addresses of any words already in the buffer means, and (h) means adding the new word to the buffer means by writing over a word when the comparator means indicates a word of the same address is already in the buffer means, and by adding the new word to a vacant location in the buffer means when the comparator means indicates there is no word having the same address in the buffer means.

22. The elevator bank simulation system of claim 1 wherein the display means includes means for initiating the addition of predetermined system operating strategies to the predetermined strategy used by the dispatcher means in developing assignment signals for the elevator cars.

23. The elevator bank simulation system of claim 1 wherein the display means includes means initiating predetermined status signals for each of the elevator cars, which status signals are provided by the sequence controlling means in response to the request initiated at the display means.

* * * * *